(12) United States Patent
Hara et al.

(10) Patent No.: US 8,749,847 B2
(45) Date of Patent: Jun. 10, 2014

(54) IMAGE PROCESSING APPARATUS, IMAGE PROCESSING METHOD AND STORAGE MEDIUM

(75) Inventors: Yuji Hara, Machida (JP); Hisashi Ishikawa, Urayasu (JP)

(73) Assignee: Canon Kabushiki Kaisha, Tokyo (JP)

( * ) Notice: Subject to any disclaimer, the term of this patent is extended or adjusted under 35 U.S.C. 154(b) by 58 days.

(21) Appl. No.: 13/234,723

(22) Filed: Sep. 16, 2011

(65) Prior Publication Data

US 2012/0086986 A1  Apr. 12, 2012

(30) Foreign Application Priority Data

Oct. 8, 2010   (JP) ................................ 2010-229035
Jul. 4, 2011   (JP) ................................ 2011-148623

(51) Int. Cl.
*H04N 1/405* (2006.01)

(52) U.S. Cl.
USPC ......... 358/3.06; 358/2.1; 358/3.19; 358/3.01; 358/3.13

(58) Field of Classification Search
CPC combination set(s) only.
See application file for complete search history.

(56) References Cited

U.S. PATENT DOCUMENTS

| 4,638,369 | A | * | 1/1987 | Hsieh ............................ 358/447 |
| 5,900,884 | A |   | 5/1999 | Minami et al. |
| 2002/0171873 | A1 | * | 11/2002 | Chang .......................... 358/3.06 |
| 2004/0125411 | A1 | * | 7/2004 | Tonami et al. ................. 358/2.1 |
| 2004/0165200 | A1 | * | 8/2004 | Nabeshima .................... 358/1.9 |
| 2008/0304751 | A1 | * | 12/2008 | Hayasaki ...................... 382/195 |
| 2009/0284800 | A1 | * | 11/2009 | Misawa ....................... 358/3.24 |
| 2010/0259791 | A1 | * | 10/2010 | Hayashi et al. ............... 358/2.1 |

FOREIGN PATENT DOCUMENTS

| JP | 9-238259 A | 9/1997 |
| JP | 2001-86355 A | 3/2001 |

* cited by examiner

*Primary Examiner* — Houshang Safaipour
*Assistant Examiner* — Idowu O Osifade
(74) *Attorney, Agent, or Firm* — Fitzpatrick, Cella, Harper & Scinto

(57) ABSTRACT

There is provided an image processing apparatus comprising: a first halftone processing unit configured to perform halftone processing on multilevel input image data; a first filter unit configured to perform smoothing filter processing on the first halftone image data; a second filter unit configured to perform smoothing filter processing on the multilevel input image data; a first difference evaluation unit configured to calculate a difference between the converted first and second filter-processed data for each pixel as a first moiré intensity; a third filter unit; a fourth filter unit; a second difference evaluation unit configured to calculate a difference between the converted third and fourth filter-processed data for each pixel as a second moiré intensity; and a moiré intensity selection unit configured to select one of the first moiré intensity and the second moiré intensity.

18 Claims, 17 Drawing Sheets

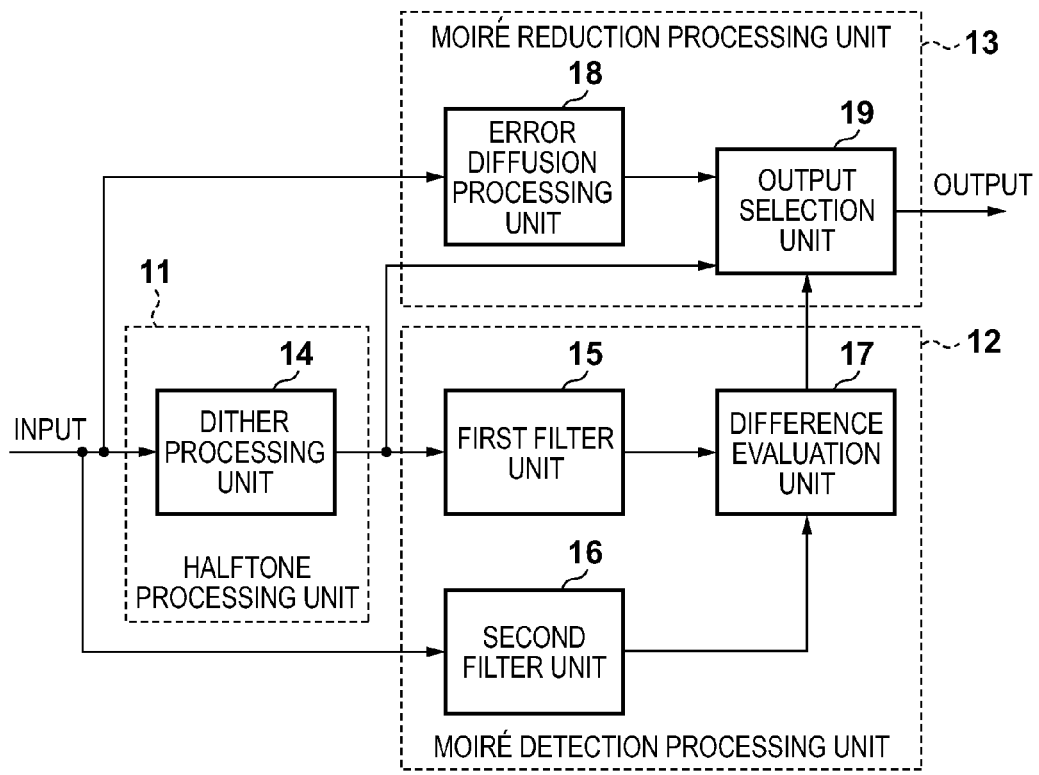

FIG. 3A

| 255 | 191 | 128 | 255 | 191 | 128 | 255 | 191 | 128 | 255 | 191 | 128 | 255 | 191 | 128 | 255 |
|---|---|---|---|---|---|---|---|---|---|---|---|---|---|---|---|
| 191 | 128 | 64 | 191 | 128 | 64 | 191 | 128 | 64 | 191 | 128 | 64 | 191 | 128 | 64 | 191 |
| 128 | 64 | 0 | 128 | 64 | 0 | 128 | 64 | 0 | 128 | 64 | 0 | 128 | 64 | 0 | 128 |
| 255 | 191 | 128 | 255 | 191 | 128 | 255 | 191 | 128 | 255 | 191 | 128 | 255 | 191 | 128 | 255 |
| 191 | 128 | 64 | 191 | 128 | 64 | 191 | 128 | 64 | 191 | 128 | 64 | 191 | 128 | 64 | 191 |
| 128 | 64 | 0 | 128 | 64 | 0 | 128 | 64 | 0 | 128 | 64 | 0 | 128 | 64 | 0 | 128 |
| 255 | 191 | 128 | 255 | 191 | 128 | 255 | 191 | 128 | 255 | 191 | 128 | 255 | 191 | 128 | 255 |
| 191 | 128 | 64 | 191 | 128 | 64 | 191 | 128 | 64 | 191 | 128 | 64 | 191 | 128 | 64 | 191 |
| 128 | 64 | 0 | 128 | 64 | 0 | 128 | 64 | 0 | 128 | 64 | 0 | 128 | 64 | 0 | 128 |
| 255 | 191 | 128 | 255 | 191 | 128 | 255 | 191 | 128 | 255 | 191 | 128 | 255 | 191 | 128 | 255 |
| 191 | 128 | 64 | 191 | 128 | 64 | 191 | 128 | 64 | 191 | 128 | 64 | 191 | 128 | 64 | 191 |
| 128 | 64 | 0 | 128 | 64 | 0 | 128 | 64 | 0 | 128 | 64 | 0 | 128 | 64 | 0 | 128 |
| 255 | 191 | 128 | 255 | 191 | 128 | 255 | 191 | 128 | 255 | 191 | 128 | 255 | 191 | 128 | 255 |
| 191 | 128 | 64 | 191 | 128 | 64 | 191 | 128 | 64 | 191 | 128 | 64 | 191 | 128 | 64 | 191 |
| 128 | 64 | 0 | 128 | 64 | 0 | 128 | 64 | 0 | 128 | 64 | 0 | 128 | 64 | 0 | 128 |
| 255 | 191 | 128 | 255 | 191 | 128 | 255 | 191 | 128 | 255 | 191 | 128 | 255 | 191 | 128 | 255 |

FIG. 3B

| 2 | 1 | 1 | 2 | 2 | 1 | 2 | 1 | 1 | 2 | 2 | 1 | 2 | 1 | 1 | 2 |
|---|---|---|---|---|---|---|---|---|---|---|---|---|---|---|---|
| 1 | 1 | 0 | 2 | 1 | 1 | 1 | 1 | 0 | 2 | 1 | 1 | 1 | 1 | 0 | 2 |
| 1 | 0 | 0 | 1 | 1 | 0 | 1 | 0 | 0 | 1 | 1 | 0 | 1 | 0 | 0 | 1 |
| 2 | 2 | 1 | 2 | 1 | 1 | 2 | 2 | 1 | 2 | 1 | 1 | 2 | 2 | 1 | 2 |
| 2 | 1 | 1 | 1 | 1 | 0 | 2 | 1 | 1 | 1 | 1 | 0 | 2 | 1 | 1 | 1 |
| 1 | 1 | 0 | 1 | 0 | 0 | 1 | 1 | 0 | 1 | 0 | 0 | 1 | 1 | 0 | 1 |
| 2 | 1 | 1 | 2 | 2 | 1 | 2 | 1 | 1 | 2 | 2 | 1 | 2 | 1 | 1 | 2 |
| 1 | 1 | 0 | 2 | 1 | 1 | 1 | 1 | 0 | 2 | 1 | 1 | 1 | 1 | 0 | 2 |
| 1 | 0 | 0 | 1 | 1 | 0 | 1 | 0 | 0 | 1 | 1 | 0 | 1 | 0 | 0 | 1 |
| 2 | 2 | 1 | 2 | 1 | 1 | 2 | 2 | 1 | 2 | 1 | 1 | 2 | 2 | 1 | 2 |
| 2 | 1 | 1 | 1 | 1 | 0 | 2 | 1 | 1 | 1 | 1 | 0 | 2 | 1 | 1 | 1 |
| 1 | 1 | 0 | 1 | 0 | 0 | 1 | 1 | 0 | 1 | 0 | 0 | 1 | 1 | 0 | 1 |
| 2 | 1 | 1 | 2 | 2 | 1 | 2 | 1 | 1 | 2 | 2 | 1 | 2 | 1 | 1 | 2 |
| 1 | 1 | 0 | 2 | 1 | 1 | 1 | 1 | 0 | 2 | 1 | 1 | 1 | 1 | 0 | 2 |
| 1 | 0 | 0 | 1 | 1 | 0 | 1 | 0 | 0 | 1 | 1 | 0 | 1 | 0 | 0 | 1 |
| 2 | 2 | 1 | 2 | 1 | 1 | 2 | 2 | 1 | 2 | 1 | 1 | 2 | 2 | 1 | 2 |

FIG. 4

| FILTER PROCESSING TARGET PIXEL | FILTER PROCESSING TARGET PIXEL | FILTER PROCESSING TARGET PIXEL | FILTER PROCESSING TARGET PIXEL |
|---|---|---|---|
| FILTER PROCESSING TARGET PIXEL | FILTER PROCESSING TARGET PIXEL | FILTER PROCESSING TARGET PIXEL | FILTER PROCESSING TARGET PIXEL |
| FILTER PROCESSING TARGET PIXEL | FILTER PROCESSING TARGET PIXEL | PIXEL OF INTEREST | FILTER PROCESSING TARGET PIXEL |
| FILTER PROCESSING TARGET PIXEL | FILTER PROCESSING TARGET PIXEL | FILTER PROCESSING TARGET PIXEL | FILTER PROCESSING TARGET PIXEL |

FIG. 5A

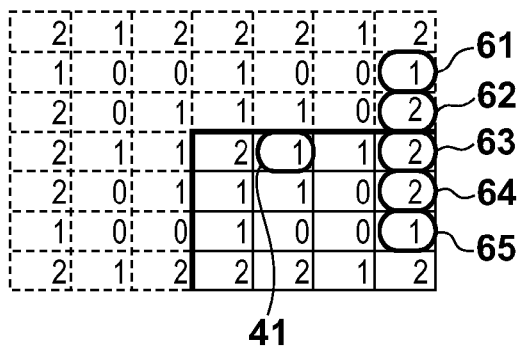

FIG. 5B

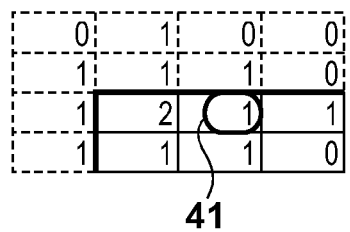

FIG. 6A

| 12 | 12 | 16 | 16 | 16 | 20 | 16 | 12 | 16 | 16 | 16 | 20 | 16 | 12 | 16 | 12 |
|----|----|----|----|----|----|----|----|----|----|----|----|----|----|----|----|
| 12 | 12 | 16 | 16 | 16 | 20 | 16 | 12 | 16 | 16 | 16 | 20 | 16 | 12 | 16 | 12 |
| 16 | 16 | 19 | 18 | 17 | 21 | 18 | 15 | 19 | 18 | 17 | 21 | 18 | 15 | 19 | 15 |
| 16 | 16 | 18 | 16 | 14 | 18 | 16 | 14 | 18 | 16 | 14 | 18 | 16 | 14 | 18 | 14 |
| 16 | 16 | 17 | 14 | 11 | 15 | 14 | 13 | 17 | 14 | 11 | 15 | 14 | 13 | 17 | 13 |
| 20 | 20 | 21 | 18 | 15 | 19 | 18 | 17 | 21 | 18 | 15 | 19 | 18 | 17 | 21 | 17 |
| 16 | 16 | 18 | 16 | 14 | 18 | 16 | 14 | 18 | 16 | 14 | 18 | 16 | 14 | 18 | 14 |
| 12 | 12 | 15 | 14 | 13 | 17 | 14 | 11 | 15 | 14 | 13 | 17 | 14 | 11 | 15 | 11 |
| 16 | 16 | 19 | 18 | 17 | 21 | 18 | 15 | 19 | 18 | 17 | 21 | 18 | 15 | 19 | 15 |
| 16 | 16 | 18 | 16 | 14 | 18 | 16 | 14 | 18 | 16 | 14 | 18 | 16 | 14 | 18 | 14 |
| 16 | 16 | 17 | 14 | 11 | 15 | 14 | 13 | 17 | 14 | 11 | 15 | 14 | 13 | 17 | 13 |
| 20 | 20 | 21 | 18 | 15 | 19 | 18 | 17 | 21 | 18 | 15 | 19 | 18 | 17 | 21 | 17 |
| 16 | 16 | 18 | 16 | 14 | 18 | 16 | 14 | 18 | 16 | 14 | 18 | 16 | 14 | 18 | 14 |
| 12 | 12 | 15 | 14 | 13 | 17 | 14 | 11 | 15 | 14 | 13 | 17 | 14 | 11 | 15 | 11 |
| 16 | 16 | 19 | 18 | 17 | 21 | 18 | 15 | 19 | 18 | 17 | 21 | 18 | 15 | 19 | 15 |
| 12 | 12 | 15 | 14 | 13 | 17 | 14 | 11 | 15 | 14 | 13 | 17 | 14 | 11 | 15 | 11 |

FIG. 6B

| 2043 | 2043 | 2297 | 2043 | 1788 | 2297 | 2043 | 1788 | 2297 | 2043 | 1788 | 2297 | 2043 | 1788 | 2297 | 1788 |
|------|------|------|------|------|------|------|------|------|------|------|------|------|------|------|------|
| 2043 | 2043 | 2297 | 2043 | 1788 | 2297 | 2043 | 1788 | 2297 | 2043 | 1788 | 2297 | 2043 | 1788 | 2297 | 1788 |
| 2297 | 2297 | 2552 | 2297 | 2043 | 2552 | 2297 | 2043 | 2552 | 2297 | 2043 | 2552 | 2297 | 2043 | 2552 | 2043 |
| 2043 | 2043 | 2297 | 2043 | 1788 | 2297 | 2043 | 1788 | 2297 | 2043 | 1788 | 2297 | 2043 | 1788 | 2297 | 1788 |
| 1788 | 1788 | 2043 | 1788 | 1533 | 2043 | 1788 | 1533 | 2043 | 1788 | 1533 | 2043 | 1788 | 1533 | 2043 | 1533 |
| 2297 | 2297 | 2552 | 2297 | 2043 | 2552 | 2297 | 2043 | 2552 | 2297 | 2043 | 2552 | 2297 | 2043 | 2552 | 2043 |
| 2043 | 2043 | 2297 | 2043 | 1788 | 2297 | 2043 | 1788 | 2297 | 2043 | 1788 | 2297 | 2043 | 1788 | 2297 | 1788 |
| 1788 | 1788 | 2043 | 1788 | 1533 | 2043 | 1788 | 1533 | 2043 | 1788 | 1533 | 2043 | 1788 | 1533 | 2043 | 1533 |
| 2297 | 2297 | 2552 | 2297 | 2043 | 2552 | 2297 | 2043 | 2552 | 2297 | 2043 | 2552 | 2297 | 2043 | 2552 | 2043 |
| 2043 | 2043 | 2297 | 2043 | 1788 | 2297 | 2043 | 1788 | 2297 | 2043 | 1788 | 2297 | 2043 | 1788 | 2297 | 1788 |
| 1788 | 1788 | 2043 | 1788 | 1533 | 2043 | 1788 | 1533 | 2043 | 1788 | 1533 | 2043 | 1788 | 1533 | 2043 | 1533 |
| 2297 | 2297 | 2552 | 2297 | 2043 | 2552 | 2297 | 2043 | 2552 | 2297 | 2043 | 2552 | 2297 | 2043 | 2552 | 2043 |
| 2043 | 2043 | 2297 | 2043 | 1788 | 2297 | 2043 | 1788 | 2297 | 2043 | 1788 | 2297 | 2043 | 1788 | 2297 | 1788 |
| 1788 | 1788 | 2043 | 1788 | 1533 | 2043 | 1788 | 1533 | 2043 | 1788 | 1533 | 2043 | 1788 | 1533 | 2043 | 1533 |
| 2297 | 2297 | 2552 | 2297 | 2043 | 2552 | 2297 | 2043 | 2552 | 2297 | 2043 | 2552 | 2297 | 2043 | 2552 | 2043 |
| 1788 | 1788 | 2043 | 1788 | 1533 | 2043 | 1788 | 1533 | 2043 | 1788 | 1533 | 2043 | 1788 | 1533 | 2043 | 1533 |

FIG. 7A

| -1026 | -1026 | -514 | -6 | 504 | 506 | -6 | -516 | -514 | -6 | 504 | 506 | -6 | -516 | -514 | -516 |
|---|---|---|---|---|---|---|---|---|---|---|---|---|---|---|---|
| -1026 | -1026 | -514 | -6 | 504 | 506 | -6 | -516 | -514 | -6 | 504 | 506 | -6 | -516 | -514 | -516 |
| -514 | -514 | -259 | -4 | 249 | 251 | -4 | -261 | -259 | -4 | 249 | 251 | -4 | -261 | -259 | -261 |
| -6 | -6 | -4 | -6 | -6 | -4 | -6 | -6 | -4 | -6 | -6 | -4 | -6 | -6 | -4 | -6 |
| 504 | 504 | 249 | -6 | -261 | -261 | -6 | 249 | 249 | -6 | -261 | -261 | -6 | 249 | 249 | 249 |
| 506 | 506 | 251 | -4 | -261 | -259 | -4 | 249 | 251 | -4 | -261 | -259 | -4 | 249 | 251 | 249 |
| -6 | -6 | -4 | -6 | -6 | -4 | -6 | -6 | -4 | -6 | -6 | -4 | -6 | -6 | -4 | -6 |
| -516 | -516 | -261 | -6 | 249 | 249 | -6 | -261 | -261 | -6 | 249 | 249 | -6 | -261 | -261 | -261 |
| -514 | -514 | -259 | -4 | 249 | 251 | -4 | -261 | -259 | -4 | 249 | 251 | -4 | -261 | -259 | -261 |
| -6 | -6 | -4 | -6 | -6 | -4 | -6 | -6 | -4 | -6 | -6 | -4 | -6 | -6 | -4 | -6 |
| 504 | 504 | 249 | -6 | -261 | -261 | -6 | 249 | 249 | -6 | -261 | -261 | -6 | 249 | 249 | 249 |
| 506 | 506 | 251 | -4 | -261 | -259 | -4 | 249 | 251 | -4 | -261 | -259 | -4 | 249 | 251 | 249 |
| -6 | -6 | -4 | -6 | -6 | -4 | -6 | -6 | -4 | -6 | -6 | -4 | -6 | -6 | -4 | -6 |
| -516 | -516 | -261 | -6 | 249 | 249 | -6 | -261 | -261 | -6 | 249 | 249 | -6 | -261 | -261 | -261 |
| -514 | -514 | -259 | -4 | 249 | 251 | -4 | -261 | -259 | -4 | 249 | 251 | -4 | -261 | -259 | -261 |
| -516 | -516 | -261 | -6 | 249 | 249 | -6 | -261 | -261 | -6 | 249 | 249 | -6 | -261 | -261 | -261 |

FIG. 7B

| 1 | 1 | 1 | 0 | 1 | 1 | 0 | 1 | 1 | 0 | 1 | 1 | 0 | 1 | 1 | 1 |
|---|---|---|---|---|---|---|---|---|---|---|---|---|---|---|---|
| 1 | 1 | 1 | 0 | 1 | 1 | 0 | 1 | 1 | 0 | 1 | 1 | 0 | 1 | 1 | 1 |
| 1 | 1 | 1 | 0 | 1 | 1 | 0 | 1 | 1 | 0 | 1 | 1 | 0 | 1 | 1 | 1 |
| 0 | 0 | 0 | 0 | 0 | 0 | 0 | 0 | 0 | 0 | 0 | 0 | 0 | 0 | 0 | 0 |
| 1 | 1 | 1 | 0 | 1 | 1 | 0 | 1 | 1 | 0 | 1 | 1 | 0 | 1 | 1 | 1 |
| 1 | 1 | 1 | 0 | 1 | 1 | 0 | 1 | 1 | 0 | 1 | 1 | 0 | 1 | 1 | 1 |
| 0 | 0 | 0 | 0 | 0 | 0 | 0 | 0 | 0 | 0 | 0 | 0 | 0 | 0 | 0 | 0 |
| 1 | 1 | 1 | 0 | 1 | 1 | 0 | 1 | 1 | 0 | 1 | 1 | 0 | 1 | 1 | 1 |
| 1 | 1 | 1 | 0 | 1 | 1 | 0 | 1 | 1 | 0 | 1 | 1 | 0 | 1 | 1 | 1 |
| 0 | 0 | 0 | 0 | 0 | 0 | 0 | 0 | 0 | 0 | 0 | 0 | 0 | 0 | 0 | 0 |
| 1 | 1 | 1 | 0 | 1 | 1 | 0 | 1 | 1 | 0 | 1 | 1 | 0 | 1 | 1 | 1 |
| 1 | 1 | 1 | 0 | 1 | 1 | 0 | 1 | 1 | 0 | 1 | 1 | 0 | 1 | 1 | 1 |
| 0 | 0 | 0 | 0 | 0 | 0 | 0 | 0 | 0 | 0 | 0 | 0 | 0 | 0 | 0 | 0 |
| 1 | 1 | 1 | 0 | 1 | 1 | 0 | 1 | 1 | 0 | 1 | 1 | 0 | 1 | 1 | 1 |
| 1 | 1 | 1 | 0 | 1 | 1 | 0 | 1 | 1 | 0 | 1 | 1 | 0 | 1 | 1 | 1 |
| 1 | 1 | 1 | 0 | 1 | 1 | 0 | 1 | 1 | 0 | 1 | 1 | 0 | 1 | 1 | 1 |

FIG. 8A

| 255 | 223 | 191 | 159 | 255 | 223 | 191 | 159 | 255 | 223 | 191 | 159 | 255 | 223 | 191 | 159 |
|---|---|---|---|---|---|---|---|---|---|---|---|---|---|---|---|
| 202 | 170 | 138 | 106 | 202 | 170 | 138 | 106 | 202 | 170 | 138 | 106 | 202 | 170 | 138 | 106 |
| 149 | 117 | 85 | 53 | 149 | 117 | 85 | 53 | 149 | 117 | 85 | 53 | 149 | 117 | 85 | 53 |
| 96 | 64 | 32 | 0 | 96 | 64 | 32 | 0 | 96 | 64 | 32 | 0 | 96 | 64 | 32 | 0 |
| 255 | 223 | 191 | 159 | 255 | 223 | 191 | 159 | 255 | 223 | 191 | 159 | 255 | 223 | 191 | 159 |
| 202 | 170 | 138 | 106 | 202 | 170 | 138 | 106 | 202 | 170 | 138 | 106 | 202 | 170 | 138 | 106 |
| 149 | 117 | 85 | 53 | 149 | 117 | 85 | 53 | 149 | 117 | 85 | 53 | 149 | 117 | 85 | 53 |
| 96 | 64 | 32 | 0 | 96 | 64 | 32 | 0 | 96 | 64 | 32 | 0 | 96 | 64 | 32 | 0 |
| 255 | 223 | 191 | 159 | 255 | 223 | 191 | 159 | 255 | 223 | 191 | 159 | 255 | 223 | 191 | 159 |
| 202 | 170 | 138 | 106 | 202 | 170 | 138 | 106 | 202 | 170 | 138 | 106 | 202 | 170 | 138 | 106 |
| 149 | 117 | 85 | 53 | 149 | 117 | 85 | 53 | 149 | 117 | 85 | 53 | 149 | 117 | 85 | 53 |
| 96 | 64 | 32 | 0 | 96 | 64 | 32 | 0 | 96 | 64 | 32 | 0 | 96 | 64 | 32 | 0 |
| 255 | 223 | 191 | 159 | 255 | 223 | 191 | 159 | 255 | 223 | 191 | 159 | 255 | 223 | 191 | 159 |
| 202 | 170 | 138 | 106 | 202 | 170 | 138 | 106 | 202 | 170 | 138 | 106 | 202 | 170 | 138 | 106 |
| 149 | 117 | 85 | 53 | 149 | 117 | 85 | 53 | 149 | 117 | 85 | 53 | 149 | 117 | 85 | 53 |
| 96 | 64 | 32 | 0 | 96 | 64 | 32 | 0 | 96 | 64 | 32 | 0 | 96 | 64 | 32 | 0 |

FIG. 8B

| 170 | 170 | 172 | 172 | 172 | 172 | 172 | 172 | 172 | 172 | 172 | 172 | 172 | 172 | 172 | 174 |
|---|---|---|---|---|---|---|---|---|---|---|---|---|---|---|---|
| 170 | 170 | 172 | 172 | 172 | 172 | 172 | 172 | 172 | 172 | 172 | 172 | 172 | 172 | 172 | 174 |
| -2 | -2 | 0 | 0 | 0 | 0 | 0 | 0 | 0 | 0 | 0 | 0 | 0 | 0 | 0 | 2 |
| -2 | -2 | 0 | 0 | 0 | 0 | 0 | 0 | 0 | 0 | 0 | 0 | 0 | 0 | 0 | 2 |
| -2 | -2 | 0 | 0 | 0 | 0 | 0 | 0 | 0 | 0 | 0 | 0 | 0 | 0 | 0 | 2 |
| -2 | -2 | 0 | 0 | 0 | 0 | 0 | 0 | 0 | 0 | 0 | 0 | 0 | 0 | 0 | 2 |
| -2 | -2 | 0 | 0 | 0 | 0 | 0 | 0 | 0 | 0 | 0 | 0 | 0 | 0 | 0 | 2 |
| -2 | -2 | 0 | 0 | 0 | 0 | 0 | 0 | 0 | 0 | 0 | 0 | 0 | 0 | 0 | 2 |
| -2 | -2 | 0 | 0 | 0 | 0 | 0 | 0 | 0 | 0 | 0 | 0 | 0 | 0 | 0 | 2 |
| -2 | -2 | 0 | 0 | 0 | 0 | 0 | 0 | 0 | 0 | 0 | 0 | 0 | 0 | 0 | 2 |
| -2 | -2 | 0 | 0 | 0 | 0 | 0 | 0 | 0 | 0 | 0 | 0 | 0 | 0 | 0 | 2 |
| -2 | -2 | 0 | 0 | 0 | 0 | 0 | 0 | 0 | 0 | 0 | 0 | 0 | 0 | 0 | 2 |
| -2 | -2 | 0 | 0 | 0 | 0 | 0 | 0 | 0 | 0 | 0 | 0 | 0 | 0 | 0 | 2 |
| -2 | -2 | 0 | 0 | 0 | 0 | 0 | 0 | 0 | 0 | 0 | 0 | 0 | 0 | 0 | 2 |
| -2 | -2 | 0 | 0 | 0 | 0 | 0 | 0 | 0 | 0 | 0 | 0 | 0 | 0 | 0 | 2 |
| -174 | -174 | -172 | -172 | -172 | -172 | -172 | -172 | -172 | -172 | -172 | -172 | -172 | -172 | -172 | -170 |

F I G. 11

| 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 |
| 0 | 0 | 0 | 1 | 0 | 0 | 1 | 0 | 0 | 1 | 0 | 0 | 1 | 0 | 0 | 1 |
| 0 | 0 | 1 | 0 | 0 | 0 | 0 | 0 | 0 | 0 | 0 | 0 | 0 | 0 | 0 | 0 |
| 0 | 0 | 0 | 0 | 0 | 0 | 0 | 0 | 1 | 0 | 0 | 0 | 1 | 0 | 0 | 0 |
| 0 | 0 | 0 | 0 | 0 | 0 | 1 | 0 | 0 | 0 | 0 | 1 | 0 | 0 | 0 | 1 |
| 0 | 0 | 1 | 0 | 0 | 1 | 0 | 0 | 0 | 0 | 0 | 0 | 0 | 0 | 0 | 0 |
| 0 | 0 | 0 | 0 | 0 | 0 | 0 | 0 | 0 | 0 | 1 | 0 | 0 | 0 | 0 | 0 |
| 0 | 0 | 0 | 0 | 1 | 0 | 0 | 0 | 0 | 1 | 0 | 0 | 0 | 0 | 1 | 0 |
| 0 | 0 | 1 | 0 | 0 | 0 | 0 | 0 | 1 | 0 | 0 | 0 | 0 | 0 | 0 | 0 |
| 0 | 0 | 0 | 0 | 0 | 0 | 0 | 1 | 0 | 0 | 0 | 0 | 0 | 1 | 0 | 0 |
| 0 | 0 | 0 | 0 | 0 | 1 | 0 | 0 | 0 | 0 | 0 | 0 | 0 | 0 | 0 | 0 |
| 0 | 0 | 1 | 0 | 1 | 0 | 0 | 0 | 0 | 0 | 0 | 0 | 1 | 0 | 0 | 0 |
| 0 | 0 | 0 | 0 | 0 | 0 | 0 | 0 | 0 | 0 | 1 | 0 | 0 | 0 | 0 | 0 |
| 0 | 0 | 0 | 0 | 0 | 0 | 0 | 0 | 1 | 0 | 0 | 0 | 0 | 0 | 0 | 1 |
| 0 | 0 | 1 | 0 | 0 | 1 | 0 | 0 | 0 | 0 | 0 | 0 | 0 | 0 | 1 | 0 |

FIG. 12A

| 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|
| 0 | 0 | 1 | 1 | 1 | 1 | 1 | 1 | 1 | 1 | 1 | 1 | 1 | 1 | 1 | 1 |
| 0 | 1 | 2 | 2 | 1 | 1 | 1 | 1 | 1 | 1 | 1 | 1 | 1 | 1 | 1 | 1 |
| 0 | 1 | 2 | 2 | 1 | 1 | 1 | 2 | 2 | 2 | 1 | 2 | 2 | 2 | 1 | 1 |
| 0 | 1 | 1 | 1 | 0 | 1 | 1 | 2 | 1 | 1 | 1 | 2 | 2 | 1 | 1 | 1 |
| 0 | 1 | 1 | 1 | 1 | 2 | 2 | 2 | 1 | 1 | 1 | 2 | 2 | 1 | 1 | 1 |
| 0 | 1 | 1 | 1 | 1 | 2 | 2 | 1 | 0 | 1 | 2 | 2 | 1 | 0 | 1 | 1 |
| 0 | 1 | 1 | 2 | 2 | 2 | 1 | 0 | 1 | 2 | 2 | 1 | 0 | 1 | 1 | 1 |
| 0 | 1 | 1 | 2 | 1 | 1 | 0 | 1 | 2 | 3 | 2 | 1 | 0 | 1 | 1 | 1 |
| 0 | 1 | 1 | 2 | 1 | 1 | 1 | 2 | 3 | 2 | 1 | 0 | 1 | 2 | 2 | 1 |
| 0 | 1 | 1 | 1 | 1 | 1 | 2 | 2 | 2 | 1 | 0 | 0 | 1 | 1 | 1 | 0 |
| 0 | 1 | 1 | 2 | 2 | 2 | 2 | 1 | 1 | 0 | 0 | 1 | 2 | 2 | 1 | 0 |
| 0 | 1 | 1 | 2 | 2 | 2 | 1 | 0 | 0 | 1 | 1 | 2 | 1 | 1 | 0 | 0 |
| 0 | 1 | 1 | 2 | 1 | 1 | 0 | 1 | 1 | 2 | 1 | 2 | 1 | 1 | 1 | 1 |
| 0 | 1 | 1 | 1 | 1 | 1 | 1 | 1 | 1 | 2 | 1 | 1 | 0 | 1 | 2 | 2 |
| 0 | 1 | 1 | 1 | 1 | 1 | 1 | 1 | 1 | 1 | 0 | 0 | 0 | 1 | 2 | 2 |

FIG. 12B

| 136 | 204 | 204 | 204 | 204 | 204 | 204 | 204 | 204 | 204 | 204 | 204 | 204 | 204 | 204 | 136 |
|---|---|---|---|---|---|---|---|---|---|---|---|---|---|---|---|
| 204 | 306 | 306 | 306 | 306 | 306 | 306 | 306 | 306 | 306 | 306 | 306 | 306 | 306 | 306 | 204 |
| 204 | 306 | 306 | 306 | 306 | 306 | 306 | 306 | 306 | 306 | 306 | 306 | 306 | 306 | 306 | 204 |
| 204 | 306 | 306 | 306 | 306 | 306 | 306 | 306 | 306 | 306 | 306 | 306 | 306 | 306 | 306 | 204 |
| 204 | 306 | 306 | 306 | 306 | 306 | 306 | 306 | 306 | 306 | 306 | 306 | 306 | 306 | 306 | 204 |
| 204 | 306 | 306 | 306 | 306 | 306 | 306 | 306 | 306 | 306 | 306 | 306 | 306 | 306 | 306 | 204 |
| 204 | 306 | 306 | 306 | 306 | 306 | 306 | 306 | 306 | 306 | 306 | 306 | 306 | 306 | 306 | 204 |
| 204 | 306 | 306 | 306 | 306 | 306 | 306 | 306 | 306 | 306 | 306 | 306 | 306 | 306 | 306 | 204 |
| 204 | 306 | 306 | 306 | 306 | 306 | 306 | 306 | 306 | 306 | 306 | 306 | 306 | 306 | 306 | 204 |
| 204 | 306 | 306 | 306 | 306 | 306 | 306 | 306 | 306 | 306 | 306 | 306 | 306 | 306 | 306 | 204 |
| 204 | 306 | 306 | 306 | 306 | 306 | 306 | 306 | 306 | 306 | 306 | 306 | 306 | 306 | 306 | 204 |
| 204 | 306 | 306 | 306 | 306 | 306 | 306 | 306 | 306 | 306 | 306 | 306 | 306 | 306 | 306 | 204 |
| 204 | 306 | 306 | 306 | 306 | 306 | 306 | 306 | 306 | 306 | 306 | 306 | 306 | 306 | 306 | 204 |
| 204 | 306 | 306 | 306 | 306 | 306 | 306 | 306 | 306 | 306 | 306 | 306 | 306 | 306 | 306 | 204 |
| 204 | 306 | 306 | 306 | 306 | 306 | 306 | 306 | 306 | 306 | 306 | 306 | 306 | 306 | 306 | 204 |
| 136 | 204 | 204 | 204 | 204 | 204 | 204 | 204 | 204 | 204 | 204 | 204 | 204 | 204 | 204 | 136 |

FIG. 13A

| -136 | -204 | -204 | -204 | -204 | -204 | -204 | -204 | -204 | -204 | -204 | -204 | -204 | -204 | -204 | -136 |
|---|---|---|---|---|---|---|---|---|---|---|---|---|---|---|---|
| -204 | -306 | -51 | -51 | -51 | -51 | -51 | -51 | -51 | -51 | -51 | -51 | -51 | -51 | -51 | 51 |
| -204 | -51 | 204 | 204 | -51 | -51 | -51 | -51 | -51 | -51 | -51 | -51 | -51 | -51 | -51 | 51 |
| -204 | -51 | 204 | 204 | -51 | -51 | -51 | 204 | 204 | 204 | -51 | 204 | 204 | 204 | -51 | 51 |
| -204 | -51 | -51 | -51 | -306 | -51 | -51 | 204 | -51 | -51 | -51 | 204 | 204 | -51 | -51 | 51 |
| -204 | -51 | -51 | -51 | -51 | 204 | 204 | 204 | -51 | -51 | -51 | 204 | 204 | -51 | -51 | 51 |
| -204 | -51 | -51 | -51 | -51 | 204 | 204 | -51 | -306 | -51 | 204 | 204 | -51 | -306 | -51 | 51 |
| -204 | -51 | -51 | 204 | 204 | 204 | -51 | -306 | -51 | 204 | 204 | -51 | -306 | -51 | -51 | 51 |
| -204 | -51 | -51 | 204 | -51 | -51 | -306 | -51 | 204 | 459 | 204 | -51 | -306 | -51 | -51 | 51 |
| -204 | -51 | -51 | 204 | -51 | -51 | -51 | 204 | 459 | 204 | -51 | -306 | -51 | 204 | 204 | 51 |
| -204 | -51 | -51 | -51 | -51 | -51 | 204 | 204 | 204 | -51 | -306 | -306 | -51 | -51 | -51 | -204 |
| -204 | -51 | -51 | 204 | 204 | 204 | 204 | -51 | -51 | -306 | -306 | -51 | 204 | 204 | -51 | -204 |
| -204 | -51 | -51 | 204 | 204 | 204 | -51 | -306 | -306 | -51 | -51 | 204 | -51 | -51 | -306 | -204 |
| -204 | -51 | -51 | 204 | -51 | -51 | -306 | -51 | -51 | 204 | -51 | 204 | -51 | -51 | -51 | 51 |
| -204 | -51 | -51 | -51 | -51 | -51 | -51 | -51 | -51 | 204 | -51 | -51 | -306 | -51 | 204 | 306 |
| -136 | 51 | 51 | 51 | 51 | 51 | 51 | 51 | 51 | 51 | -204 | -204 | -204 | 51 | 306 | 374 |

FIG. 13B

| 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|
| 0 | 1 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 1 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 1 | 0 | 0 | 0 | 0 | 1 | 0 | 0 |
| 0 | 0 | 0 | 0 | 0 | 0 | 0 | 1 | 0 | 0 | 0 | 0 | 1 | 0 | 0 | 0 |
| 0 | 0 | 0 | 0 | 0 | 0 | 1 | 0 | 0 | 1 | 0 | 0 | 1 | 0 | 0 | 0 |
| 0 | 0 | 0 | 0 | 0 | 0 | 0 | 0 | 1 | 0 | 0 | 1 | 0 | 0 | 0 | 0 |
| 0 | 0 | 0 | 0 | 0 | 0 | 0 | 0 | 0 | 0 | 1 | 1 | 0 | 0 | 0 | 0 |
| 0 | 0 | 0 | 0 | 0 | 0 | 0 | 0 | 0 | 1 | 1 | 0 | 0 | 0 | 0 | 0 |
| 0 | 0 | 0 | 0 | 0 | 0 | 0 | 0 | 1 | 1 | 0 | 0 | 0 | 0 | 1 | 0 |
| 0 | 0 | 0 | 0 | 0 | 0 | 0 | 1 | 0 | 0 | 0 | 0 | 0 | 0 | 0 | 0 |
| 0 | 0 | 0 | 0 | 0 | 0 | 0 | 0 | 0 | 0 | 0 | 0 | 1 | 0 | 0 | 1 |
| 0 | 0 | 0 | 0 | 0 | 0 | 0 | 0 | 0 | 0 | 0 | 0 | 0 | 0 | 1 | 1 |

FIG. 14A

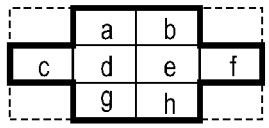

FIG. 14B

| f | a | b | g | h | c | d | e | f | a | b | g | h | c | d | e |
|---|---|---|---|---|---|---|---|---|---|---|---|---|---|---|---|
| c | d | e | f | a | b | g | h | c | d | e | f | a | b | g | h |
| b | g | h | c | d | e | f | a | b | g | h | c | d | e | f | a |
| e | f | a | b | g | h | c | d | e | f | a | b | g | h | c | d |
| h | c | d | e | f | a | b | g | h | c | d | e | f | a | b | g |
| a | b | g | h | c | d | e | f | a | b | g | h | c | d | e | f |
| d | e | f | a | b | g | h | c | d | e | f | a | b | g | h | c |
| g | h | c | d | e | f | a | b | g | h | c | d | e | f | a | b |
| f | a | b | g | h | c | d | e | f | a | b | g | h | c | d | e |
| c | d | e | f | a | b | g | h | c | d | e | f | a | b | g | h |
| b | g | h | c | d | e | f | a | b | g | h | c | d | e | f | a |
| e | f | a | b | g | h | c | d | e | f | a | b | g | h | c | d |
| h | c | d | e | f | a | b | g | h | c | d | e | f | a | b | g |
| a | b | g | h | c | d | e | f | a | b | g | h | c | d | e | f |
| d | e | f | a | b | g | h | c | d | e | f | a | b | g | h | c |
| g | h | c | d | e | f | a | b | g | h | c | d | e | f | a | b |

FIG. 14C

| f | a | b | g | h | c | d | e |
|---|---|---|---|---|---|---|---|
| c | d | e | f | a | b | g | h |
| b | g | h | c | d | e | f | a |
| e | f | a | b | g | h | c | d |
| h | c | d | e | f | a | b | g |
| a | b | g | h | c | d | e | f |
| d | e | f | a | b | g | h | c |
| g | h | c | d | e | f | a | b |

FIG. 14D

| FILTER PRO- CESSING TARGET PIXEL | FILTER PRO- CESSING TARGET PIXEL | FILTER PRO- CESSING TARGET PIXEL | FILTER PRO- CESSING TARGET PIXEL | FILTER PRO- CESSING TARGET PIXEL | FILTER PRO- CESSING TARGET PIXEL | FILTER PRO- CESSING TARGET PIXEL | PIXEL OF INTEREST |

FIG. 15A

| f | a | b | g | h | c | d | e |
|---|---|---|---|---|---|---|---|
| c | d | e | f | a | b | g | h |
| b | g | h | c | d | e | f | a |
| e | f | a | b | g | h | c | d |
| h | c | d | e | f | a | b | g |
| a | b | g | h | c | d | e | f |
| d | e | f | a | b | g | h | c |
| g | h | c | d | e | f | a | b |

FIG. 15B

| 1 | 1 | 1/2 |
|---|---|-----|
| 1 | 1 | 1 |
| 1/2 | 1 | 1 |

FIG. 15C

| f | a | b | g | h | c | d | e |
|---|---|---|---|---|---|---|---|
| c | d | e | f | a | b | g | h |
| b | g | h | c | d | e | f | a |
| e | f | a | b | g | h | c | d |
| h | c | d | e | f | a | b | g |
| a | b | g | h | c | d | e | f |
| d | e | f | a | b | g | h | c |
| g | h | c | d | e | f | a | b |

FIG. 15D

| 43 | 64 | 64 | 64 | 64 |
|----|----|----|----|----|
| 64 | 128 | 128 | 85 | 64 |
| 64 | 128 | 128 | 128 | 64 |
| 64 | 85 | 128 | 128 | 64 |
| 64 | 64 | 64 | 64 | 43 |

FIG. 16

| f2 | a3 | b3 | g9 | h9 | c7 | d7 | e7 | f7 | a8 | b8 | g5 | h5 | c6 | d6 | e6 |
|----|----|----|----|----|----|----|----|----|----|----|----|----|----|----|----|
| c3 | d3 | e3 | f3 | a1 | b1 | g7 | h7 | c8 | d8 | e8 | f8 | a9 | b9 | g6 | h6 |
| b6 | g3 | h3 | c1 | d1 | e1 | f1 | a2 | b2 | g8 | h8 | c9 | d9 | e9 | f9 | a7 |
| e6 | f6 | a4 | b4 | g1 | h1 | c2 | d2 | e2 | f2 | a3 | b3 | g9 | h9 | c7 | d7 |
| h6 | c4 | d4 | e4 | f4 | a5 | b5 | g2 | h2 | c3 | d3 | e3 | f3 | a1 | b1 | g7 |
| a7 | b7 | g4 | h4 | c5 | d5 | e5 | f5 | a6 | b6 | g3 | h3 | c1 | d1 | e1 | f1 |
| b7 | e7 | f7 | a8 | b8 | g5 | h5 | c6 | d6 | e6 | f6 | a4 | b4 | g1 | h1 | c2 |
| g7 | h7 | c8 | d8 | e8 | f8 | a9 | b9 | g6 | h6 | c4 | d4 | e4 | f4 | a5 | b5 |
| f1 | a2 | b2 | g8 | h8 | c9 | d9 | e9 | f9 | a7 | b7 | g4 | h4 | c5 | d5 | e5 |
| c2 | d2 | e2 | f2 | a3 | b3 | g9 | h9 | c7 | d7 | e7 | f7 | a8 | b8 | g5 | h5 |
| b5 | g2 | h2 | c3 | d3 | e3 | f3 | a1 | b1 | g7 | h7 | c8 | d8 | e8 | f8 | a9 |
| e5 | f5 | a6 | b6 | g3 | h3 | c1 | d1 | e1 | f1 | a2 | b2 | g8 | h8 | c9 | d9 |
| h5 | c6 | d6 | e6 | f6 | a4 | b4 | g1 | h1 | c2 | d2 | e2 | f2 | a3 | b3 | g9 |
| a9 | b9 | g6 | h6 | c4 | d4 | e4 | f4 | a5 | b5 | g2 | h2 | c3 | d3 | e3 | f3 |
| d9 | e9 | f9 | a7 | b7 | g4 | h4 | c5 | d5 | e5 | f5 | a6 | b6 | g3 | h3 | c1 |
| g9 | h9 | c7 | d7 | e7 | f7 | a8 | b8 | g5 | h5 | c6 | d6 | e6 | f6 | a4 | b4 |

FIG. 17

| 56 | 88 | 144 | 224 | 168 | 104 | 200 | 152 |
|----|----|-----|-----|-----|-----|-----|-----|
| 120 | 184 | 232 | 128 | 72 | 40 | 136 | 216 |
| 248 | 192 | 96 | 32 | 0 | 8 | 80 | 176 |
| 208 | 240 | 160 | 64 | 24 | 16 | 48 | 112 |
| 168 | 104 | 200 | 152 | 56 | 88 | 144 | 224 |
| 72 | 40 | 136 | 216 | 120 | 184 | 232 | 128 |

IMAGE PROCESSING APPARATUS, IMAGE PROCESSING METHOD AND STORAGE MEDIUM

BACKGROUND OF THE INVENTION

1. Field of the Invention

The present invention relates to an image processing apparatus and an image processing method for detecting moiré generated when converting a multi-tone image into an image with fewer tones.

2. Description of the Related Art

Printing image data processed by a computer on printing paper or displaying the image on a display apparatus has become widespread in recent years. In such print or display processing, when the number of tones per pixel is compared between the images before and after output, the number of tones the printing apparatus or display apparatus can express may be smaller than the number of tones expressing image data on the computer. When outputting to such printing apparatus or display apparatus, halftone processing is often performed to convert multi-tone image data into image data with fewer tones. However, the image quality may be degraded due to moiré generated by halftone processing, and a measure is demanded for this problem.

Ordered dithering is known as one of the halftone processing methods, which determines the output value by comparison with periodically repeating thresholds. In the ordered dithering, when an input includes a spatial frequency component close to the threshold cycle, moiré corresponding to the difference between the threshold and the spatial frequency is generated. Another known example of halftone processing is the error diffusion method. In the error diffusion method, when an input has a flat specific density, moiré is generated due to a repetitive structure with a specific pattern.

One of the techniques for detecting such moiré uses the difference between input image data and halftone-processed image data (for example, Japanese Patent Laid-Open No. 9-238259). According to this method, the difference data between input image data and halftone-processed image data is obtained. A moiré component is then extracted by bandpass filter processing of the difference data.

There also exists a method of detecting moiré by performing filter processing based on visual characteristics for halftone-processed image data obtained by applying halftone processing to input image data (for example, Japanese Patent Laid-Open No. 2001-86355). According to this method, filter processing based on visual characteristics is performed for each of the halftone-processed image data obtained by applying halftone processing to input image data and image data obtained by shifting the input image data by a ½ phase and then applying halftone processing to it. The difference between the filtered image data is evaluated.

According to the above-described conventional moiré detection method, when a document that has already been halftone-processed and printed is read, further processed, and output, it is impossible to appropriately detect only the moiré generated at the time of processing. That is, when halftone-processed image data has undergone another halftone processing, it is difficult to detect the presence/absence of moiré.

In the above-described case, conventionally, halftone dots are detected by pattern detection or the like. The portion detected as the halftone dots is subjected to smoothing and then to halftone processing. However, to detect halftone dots by pattern detection, patterns need to be prepared in accordance with the number of lines of halftone dots or the reading resolution, resulting in an increase in the processing amount and the circuit scale. In addition, since pattern matching is performed, a detection error or detection oversight occurs inevitably. To increase the accuracy, it is necessary to refer to pixels in a wide range or perform complex processing such as isolated point processing or expansion processing. When halftone processing is performed for a faint thin line, the reproducibility of the thin line greatly varies depending on the tilt of the thin line or the phase of the screen angle. Only one technique of coping with this is edge enhancement.

SUMMARY OF THE INVENTION

The present invention has been made to solve the above-described problems, and provides an image processing apparatus and an image processing method for accurately detecting moiré using a simple arrangement.

According to one aspect of the invention, an image processing apparatus comprises: a first halftone processing unit configured to perform halftone processing on multilevel input image data to generate first halftone image data; a first filter unit configured to perform smoothing filter processing on the first halftone image data to generate first filter-processed data, which processing is performed for each pixel of interest referring to a neighboring first region including the pixel of interest; a second filter unit configured to perform smoothing filter processing on the multilevel input image data to generate second filter-processed data, which processing is performed for each pixel of interest referring to the first region; a first difference evaluation unit configured to convert the first filter-processed data and the second filter-processed data to equalize the number of tones per pixel, and calculate a difference between the converted first and second filter-processed data for each pixel as a first moiré intensity; a third filter unit configured to perform smoothing filter processing on the first halftone image data to generate third filter-processed data, which processing is performed for each pixel of interest referring to a neighboring second region including the pixel of interest, and wherein the second region is smaller than the first region; a fourth filter unit configured to perform smoothing filter processing on the multilevel input image data to generate fourth filter-processed data, which processing is performed for each pixel of interest referring to the second region; a second difference evaluation unit configured to convert the third filter-processed data and the fourth filter-processed data to equalize the number of tones per pixel, and calculate a difference between the converted third and fourth filter-processed data for each pixel as a second moiré intensity; and a moiré intensity selection unit configured to select one of the first moiré intensity and the second moiré intensity based on a feature amount in the multilevel input image data in a predetermined region including the pixel of interest, and output the selected moiré intensity.

According to another aspect of the invention, an image processing method comprising the steps of: performing halftone processing on multilevel input image data to generate first halftone image data; performing smoothing filter processing on the first halftone image data to generate first filter-processed data, which processing is performed for each pixel of interest referring to a neighboring first region including the pixel of interest; performing smoothing filter processing on the multilevel input image data to generate second filter-processed data, which processing is performed for each pixel of interest referring to the first region; converting the first filter-processed data and the second filter-processed data to equalize the number of tones per pixel, calculating a difference between the converted first and second filter-processed data for each pixel as a first moiré intensity; performing smoothing filter processing on the first halftone image data to generate third filter-processed data, which processing is performed for each pixel of interest referring to a neighboring second region including the pixel of interest, and wherein the second region is smaller than the first region; performing smoothing filter processing on the multilevel input image data to generate fourth filter-processed data, which processing is performed for each pixel of interest referring to the second region; converting the third filter-processed data and the fourth filter-processed data to equalize the number of tones per pixel, calculating a difference between the converted third and fourth filter-processed data for each pixel as a second moiré intensity; selecting one of the first moiré intensity and the second moiré intensity based on a feature amount in the multilevel input image data in a predetermined region including the pixel of interest; and outputting the selected moiré intensity.

According to some aspects of the invention, there are provided an image processing apparatus and an image processing method for accurately detecting moiré using a simple arrangement.

Further features of the present invention will become apparent from the following description of exemplary embodiments (with reference to the attached drawings).

BRIEF DESCRIPTION OF THE DRAWINGS

FIG. 1 is a block diagram showing an example of the arrangement of an image processing apparatus according to the first embodiment of the present invention;

FIG. 2 is a view showing a dither matrix used in dither processing according to the embodiment;

FIGS. 3A and 3B are views showing input image data and a dither processing result according to the embodiment;

FIG. 4 is a view showing a filter processing target region in first filter processing according to the embodiment;

FIGS. 5A and 5B are views showing halftone image data reflection processing according to the embodiment;

FIGS. 6A and 6B are views showing examples of first and second filter processed image data according to the embodiment;

FIGS. 7A and 7B are views showing examples of difference image data and moiré determination data according to the embodiment;

FIGS. 8A and 8B are views showing examples of input image data that generates no moiré and corresponding difference image data according to the embodiment;

FIG. 11 is a view showing an example of image data after halftone processing according to the second embodiment;

FIGS. 12A and 12B are views showing examples of first and second filter processed image data according to the second embodiment;

FIGS. 13A and 13B are views showing examples of difference image data and moiré determination data according to the second embodiment;

FIGS. 14A to 14D are views showing the relationship between a dither threshold cycle and a filter processing target region according to the embodiment;

FIGS. 15A to 15D are views showing examples of a filter processing target region and corresponding filter coefficients according to the embodiment;

FIG. 16 is a view showing an example of a dither matrix by the super cell method according to the embodiment;

FIG. 17 is a view showing an example of a dither matrix according to the third embodiment;

DESCRIPTION OF THE EMBODIMENTS

Figure 9:
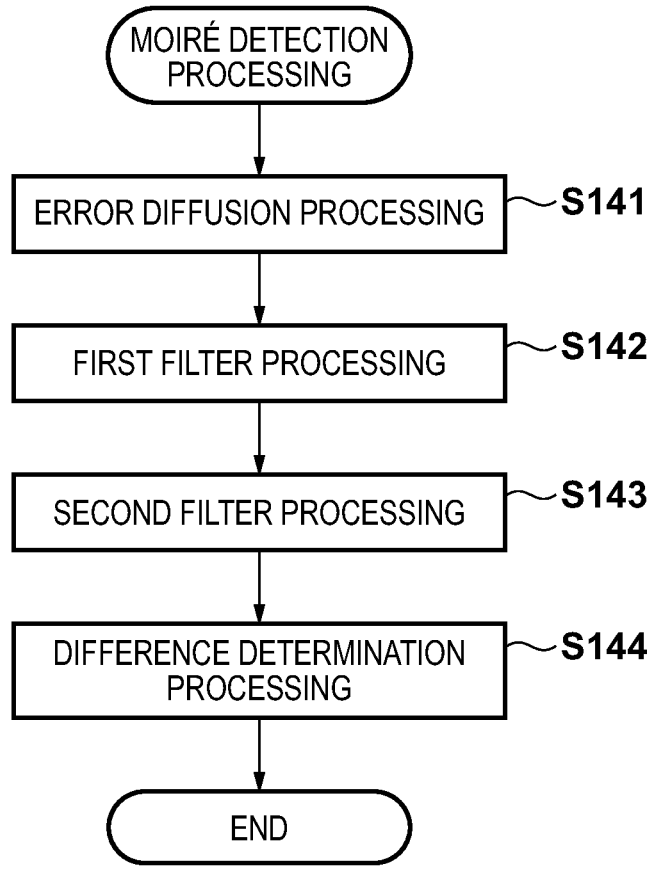
FIG. 9 is a flowchart illustrating moiré detection processing according to the second embodiment.

Some embodiments of the present invention will now be described in detail with reference to the accompanying drawings. Note that the arrangements to be described in the following embodiments are merely examples, and the present invention is not limited to the illustrated arrangements.

First Embodiment

Arrangement of Apparatus and Outline of Processing

FIG. 1 is a block diagram showing the arrangement of an image processing apparatus to which the embodiment is applied. As shown in FIG. 1, the image processing apparatus of this embodiment includes a halftone processing unit 11, a moiré detection processing unit 12, and a moiré reduction processing unit 13.

In the halftone processing unit 11, a dither processing unit 14 performs halftone processing by ordered dithering for multilevel input image data to generate halftone image data.

The moiré detection processing unit 12 includes a first filter unit 15, a second filter unit 16, and a difference evaluation unit 17. The first filter unit 15 calculates the sum of pixel values for the pixel of interest in the halftone image data output from the halftone processing unit 11 and neighbor pixels (first region) defined with respect to the pixel of interest and including the pixel of interest. That is, the first filter unit 15 performs smoothing filter processing for the first region serving as the processing target in the halftone image data to generate first filter-processed data (first filter processing). The second filter unit 16 calculates the sum of pixel values for the pixel of interest in the multilevel input image data and neighbor pixels similarly defined with respect to the pixel of interest like the first region. That is, the second filter unit 16 performs smoothing filter processing for the first region serving as the processing target in the multilevel input image data to generate second filter-processed data (second filter processing). The difference evaluation unit 17 evaluates the difference between the first filter-processed data that is the processing result of the first filter unit 15 and the second filter-processed data that is the processing result of the second filter unit 16, thereby detecting moiré. More specifically, first, to cancel the influence of tone reduction by the halftone processing unit 11 to be described later, the filter processing results of the first and second filter units 15 and 16 are converted (normalized) to equalize the number of tones per pixel. After that, the difference between the halftone image data and the multilevel input image data is calculated as the moiré intensity. If the absolute value of the difference exceeds a predetermined threshold, "1" is set and output as moiré determination data.

The moiré reduction processing unit 13 includes an error diffusion processing unit 18 and an output selection unit 19. The error diffusion processing unit 18 performs halftone processing with different characteristics to prepare for moiré in the dither processing unit 14 in the halftone processing unit 11. The output selection unit 19 selects and outputs one of the halftone processing results from the dither processing unit 14 and that from the error diffusion processing unit 18 based on the moiré determination data from the difference evaluation unit 17 in the moiré detection processing unit 12. That is, if the moiré determination data from the difference evaluation unit 17 is equal to or less than the predetermined threshold (in this embodiment, if the data is "0"), no moiré is detected, and the output selection unit 19 selects the halftone processing result of the dither processing unit 14. On the other hand, if the moiré determination data exceeds the predetermined threshold (in this embodiment, if the data is "1"), moiré is detected, and the output selection unit 19 selects the halftone processing result of the error diffusion processing unit 18.

As described above, according to the image processing apparatus of this embodiment, when moiré is detected based on the first halftone processing result, the first halftone processing result is replaced with the second halftone processing result. It is therefore possible to perform halftone processing with little moiré as compared to a case in which only first halftone processing is executed.

Processing of each component of the image processing apparatus will be explained below in detail.

Halftone Processing

Dither processing in the halftone processing unit 11 will be described first. The dither processing unit 14 included in the halftone processing unit 11 converts multilevel input image data with 256 grayscale levels in which the pixels have pixel values ranging from 0 to 255 into halftone image data with three tones ranging from 0 to 2. Note that the multilevel input image data expresses black by pixel value "0" and white by pixel value "255". The halftone image data expresses black by pixel value "0" and white by pixel value "2". An example will be described here in which grayscale image data with 256 tones is converted into halftone image data with 3 tones. However, the present invention is applicable to a different number of tones. Additionally, the present invention is also applicable to color image data by performing the same processing for each color component.

FIG. 2 shows a threshold matrix referred by the dither processing unit 14. The dither processing unit 14 selects a row and a column of the threshold matrix shown in FIG. 2 in accordance with remainders obtained by dividing the row number and the column number corresponding to an input pixel position by 4, thereby obtaining a pair of thresholds. That is, the fourth row uses the same thresholds as in the 0th row, and the fifth row uses the same thresholds as in the first row. This also applies to the columns. The fourth column uses the same thresholds as in the 0th column, and the fifth column uses the same thresholds as in the first column. Hence, the thresholds shown in FIG. 2 are applied to the multilevel input image data repeatedly every four rows and every four columns. The dither processing unit 14 compares an input pixel value with two thresholds. If the input pixel value is smaller than both thresholds, halftone pixel value "0" is output. If the input pixel value is equal to or larger than one threshold and smaller than the other threshold, halftone pixel value "1" is output. If the input pixel value exceeds or at least equals both thresholds, halftone pixel value "2" is output.

FIGS. 3A and 3B show examples of multilevel input image data and halftone image data as the dither processing result. FIG. 3A shows multilevel input image data in which the values apparently repeat in a cycle of three pixels. For this reason, when dither processing is performed using the thresholds on the 4-pixel cycle shown in FIG. 2, moiré is generated.

For example, a pixel 31 has a pixel value 255 and is located on the 0th row and the sixth column. The row and column numbers leave remainders of 0 and 2, respectively, when divided by 4. Hence, the dither processing unit 14 obtains thresholds "20" and "148" by referring to the 0th row and the second column of the threshold matrix in FIG. 2, and compares them with the input pixel value "255" of the pixel 31, thereby obtaining the halftone pixel value "2". A pixel 32 has a pixel value "191" and is located on the 0th row and the seventh column. Hence, the dither processing unit 14 compares thresholds "116" and "244" on the 0th row and the third column in FIG. 2 with the input pixel value "191", thereby obtaining the halftone pixel value "1". The dither processing unit 14 thus obtains halftone image data shown in FIG. 3B from the multilevel input image data shown in FIG. 3A. As can be seen from FIG. 3B, a periodical pixel value sequence occurs.

Note that in the above-described example, the threshold matrix has four rows and four columns, and dither processing converts image data into ternary data. However, the threshold matrix may have a cycle other than 4×4, and the number of tones of the dither processing result is not limited to three.

Moiré Detection Processing

Moiré detection processing of the moiré detection processing unit 12 will be described next. Defining each pixel of the halftone image data output from the dither processing unit 14 as the pixel of interest, the first filter unit 15 calculates the sum of pixel values in the region with four rows and four columns including the pixel of interest, as shown in FIG. 4, thereby smoothing the halftone image data. Note that the size of the filter processing target region as the calculation target is 4×4 equaling the dither threshold cycle in the dither processing unit 14.

Note that when, for example, a pixel 41 of the halftone image data shown in FIG. 3B is the pixel of interest, the 4×4 region (filter processing target region) near the pixel of interest, which has the shape as shown in FIG. 4, partially falls outside the halftone image data. In this case, the halftone image data is reflected across the column and row on the edges to obtain virtual pixel values outside the halftone image data, as shown in FIG. 5A. In the reflection processing shown in FIG. 5A, the 4×4 region of the upper left portion (solid lines) of the halftone image data shown in FIG. 3B is reflected to add reflected image data (broken lines). That is, as the pixel values of pixels 61 and 62 outside the halftone image data, the pixel values of pixels 65 and 64 symmetrical with respect to a pixel 63 at the edge of the halftone image data are applied, respectively. Hence, when the pixel 41 of the halftone image data shown in FIG. 3B is the pixel of interest, the sum of pixel values is calculated in the filter processing target region shown in FIG. 5B, which has the same shape as that of the filter processing target region shown in FIG. 4.

The first filter unit 15 processes the halftone image data shown in FIG. 3B in the above-described way, thereby obtaining first filter-processed image data shown in FIG. 6A.

The second filter unit 16 performs the same processing as that of the first filter unit 15 including the reflection processing shown in FIG. 5A except that the processing target is not the halftone image data but the multilevel input image data. The second filter unit 16 processes the multilevel input image data shown in FIG. 3A, thereby obtaining second filter-processed image data shown in FIG. 6B.

The difference evaluation unit 17 evaluates the difference between the first filter-processed image data and the second filter-processed image data. The halftone image data that is the base of the first filter-processed image data has three values (minimum value "0", maximum value "3"), whereas the multilevel input image data that is the base of the second filter-processed image data has 256 values (minimum value "0", maximum value "255"). Hence, the first filter-processed image data and the second filter-processed image data cannot simply be compared. In this embodiment, the first filter-processed image data and the second filter-processed image data are normalized such that the maximum value becomes 510. More specifically, for the first filter-processed image data, since the maximum value is 2, each element is multiplied by 510÷2=255. For the second filter-processed image data, since the maximum value is 255, each element is multiplied by 510÷255=2.

FIG. 7A shows an example of the difference calculated between the thus normalized first and second filter-processed image data. In the difference image data shown in FIG. 7A, negative values (approximately −260) and positive values (approximately 250) having relatively large absolute values periodically appear. This means that high-density portions and low-density portions periodically repeat in the halftone image data as compared to the multilevel input image data. Such a density variation is visually recognized as moiré. The difference evaluation unit 17 determines a pixel whose absolute value in the difference image data shown in FIG. 7A is equal to or larger than a predetermined threshold (in this case, 200) to be moiré, and configures 1 in moiré determination data. FIG. 7B shows an example of moiré determination data obtained from the difference image data in FIG. 7A. Note that the predetermined threshold can be determined depending on the quantization characteristic of the dither processing unit 14. For example, in the dither processing shown in FIG. 2, the dither matrix has 16×2=32 thresholds. The value corresponding to the quantization step width is 255/32≈256/32=8. A threshold of the dither matrix is normally configured in the middle of a quantization representative value. Hence, the maximum value of quantization error is ½ the quantitation step width, that is, 4. The maximum values of quantization error are totalized for 4×4=16 pixels, and normalization is performed, thereby obtaining 4×16×2=128 as the maximum value of quantitation error corresponding to each pixel of the difference image data. Hence, a value of 128 or more corresponding to the accuracy of moiré determination can be configured as the predetermined threshold.

FIG. 8A shows an example of multilevel input image data that generates no moiré in the dither processing using the threshold matrix on the 4-pixel cycle shown in FIG. 2 for the sake of comparison. When the dither processing and moiré detection processing are performed for the multilevel input image data shown in FIG. 8A, like the multilevel input image data shown in FIG. 3A, difference image data shown in FIG. 8B is finally obtained. In the difference image data shown in FIG. 8B, most pixels have small values, although relatively large values of approximately 170 appear at the edges. When moiré determination is done for the difference image data shown in FIG. 8B using, for example, a threshold 200, like the difference image data shown in FIG. 7A, all moiré determination data are 0. Note that the relatively large values appear at the edges of the difference image data in FIG. 8B because of the influence of reflection processing as shown in FIG. 5A.

As described above, the moiré detection processing unit 12 of this embodiment can detect moiré generated in multilevel input image data as moiré determination data.

Moiré Reduction Processing Unit

Moiré reduction processing of the moiré reduction processing unit 13 will be described below. In the moiré reduction processing unit 13, the error diffusion processing unit 18 performs error diffusion processing for the multilevel input image data to obtain error diffusion image data. Note that the error diffusion processing unit 18 performs second halftone processing of characteristics different from those of the first halftone processing of the dither processing unit 14. Hence, the error diffusion processing unit 18 may perform not error diffusion but, for example, dithering using a threshold cycle or screen angle different from that of the dither processing unit 14. When dithering with a screen angle different from that of dithering of the dither processing unit 14 is used as the second halftone processing, the screen angle in the second halftone processing can be perpendicular or almost perpendicular to the screen angle of dither processing of the dither processing unit 14.

The output selection unit 19 selects output pixel values in accordance with the moiré determination data from the difference evaluation unit 17. That is, when moiré determination data for a pixel of interest is 0, the halftone image data (first halftone image data) from the dither processing unit 14 is selected. On the other hand, if moiré determination data is 1, the error diffusion image data (second halftone image data) from the error diffusion processing unit 18 is selected. This enables to obtain a satisfactory halftone processing result in this embodiment as compared to an arrangement including only the halftone processing unit 11 but neither the moiré detection processing unit 12 nor the moiré reduction processing unit 13.

Dither Threshold Cycle and Filter Processing Target Region

The relationship between the dither threshold cycle (halftone processing cycle) of the dither processing unit 14 and the filter processing target region of the first and second filter units 15 and 16 in the moiré detection processing unit 12 will be described with reference to FIGS. 14A to 14D, 15A to 15D, and 16.

For example, a unit cell including eight thresholds a to h as elements excluding the corners of the rectangle, as shown in FIG. 14A, is usable as the threshold matrix of dither processing. This unit cell can also be arranged on a plane representing multilevel input image data. FIG. 14B shows an example (plane filling example) in which a plane representing multilevel input image data is filled with the threshold unit cell shown in FIG. 14A. As is apparent from the plane filling example of FIG. 14B, an 8×8 threshold region shown in FIG. 14C is repeatedly arranged. At this time, each of the eight thresholds a to h appears once in the upper hatched portion of the threshold region in FIG. 14C. Similarly, each of the eight thresholds a to h appears once in each row or each column of the threshold region.

To configure the size of the filter processing target region of the first and second filter units 15 and 16 to be equal to the dither threshold cycle of the dither processing unit 14, the filter processing target region has the same shape as that of the unit cell shown in FIG. 14A. However, if the thresholds of dither processing have a predetermined periodicity as shown in FIGS. 14A to 14C, the filter processing target region may be a 1×8 region including the pixel of interest, as shown in FIG. 14D. In this case, the eight thresholds a to h appear the same number of times (in this example, once) in the filter processing target region.

Alternatively, a rectangular region indicated by a double line frame with the pixel of interest (hatched portion) at the center, as shown in FIG. 15A or 15C, may be applied as the filter processing target region for the threshold region shown in FIG. 14C. In the example of FIG. 15A, the dither threshold a appears twice, and each of the remaining thresholds appears once in the rectangular region. Even when the pixel of interest moves, the upper right threshold and the lower left threshold with respect to the pixel of interest are the same, and all the remaining thresholds are different. In this case, the first and second filter units 15 and 16 may add weights corresponding to the thresholds. That is, spatial filter processing is performed using "½" as the weight corresponding to the positions where the same threshold appears twice and "1" as the weight corresponding to the remaining positions, as in the coefficient matrix shown in FIG. 15B. This uniforms the weights of the dither thresholds in the filter processing target region so that the influence of thresholds at the time of dither processing can be removed from the first and second filter-processed image data.

When the rectangular region indicated by the double line frame in FIG. 15C is used as the filter processing target region, the threshold a appears four times, and each of the remaining thresholds appears three times in the 5×5 rectangular region. At this time, weights may be configured in correspondence with the threshold appearance frequencies and the distances from the pixel of interest, as in the coefficient matrix shown in FIG. 15D. According to the coefficient matrix in FIG. 15D, concerning the threshold a that appears four times in the 5×5 rectangular region of FIG. 15C, a weight "85" is set for two portions adjacent to the pixel of interest, and a weight "43" is set for the remaining two portions. The total weight corresponding to the threshold a is "256". As for the remaining thresholds other than a, which appear three times in the rectangular region, a weight "128" is set for one portion corresponding to the pixel of interest itself or adjacent to it, and a weight "64" is set for the remaining two portions. The total weight corresponding to each threshold is "256", like the threshold a.

There is also a known method called super cell which determines the thresholds of dither processing by combining a short-period variation and a long-period variation. That is, as shown in FIG. 16, long-period variation components are added to the short-period variation thresholds as in the plane filling example shown in FIG. 14B. The average value of thresholds a1 to a9 in FIG. 16 is the threshold a in FIG. 14B. For remaining thresholds b1 to b9, . . . , h1 to h9 in FIG. 16 as well, the average values are the thresholds b to h in FIG. 14B. Note that if the long-period variations are neglected (the amplitude is 0), the thresholds a1 to a9 in FIG. 16 can be represented by the threshold a (quantitation representative threshold) in FIG. 14B. For the remaining thresholds b1 to b9, . . . , h1 to h9 in FIG. 16 as well, the thresholds b to h in the plane filling example shown in FIG. 14B are used as the quantitation representative thresholds, thereby enabling the same processing as described above.

As described above, according to this embodiment, the difference between the density evaluation values before dither processing and those after dither processing is calculated using filters with the same weights for the respective dither thresholds. This makes it possible to accurately detect the intensity of moiré generated in a halftone image upon dither processing using a simple method and reduce the moiré.

Note that in this embodiment, an example has been described in which the size of the filter processing target region of the first and second filter units 15 and 16 is configured so as to be equal to the dither threshold cycle (threshold matrix), or to a number such that the weights of the respective thresholds of the threshold matrix equal. However, the filter processing target region of this embodiment is not limited to this and may have a filter size corresponding to an integer multiple of the dither threshold cycle. That is, the size may be configured such that the numbers of pixels of the respective thresholds equal.

Second Embodiment

The second embodiment of the present invention will be described below. In the above-described first embodiment, an example has been described in which multilevel input image data with 256 tones ranging from 0 to 255 is converted by dithering into halftone image data with three tones 0 to 2, and moiré generated in the halftone image data is detected. In the second embodiment, an example will be explained in which multilevel input image data with 256 tones ranging from 0 to 255 is converted by error diffusion into halftone image data with two tones 0 and 1, and moiré generated in the halftone image data is detected. An image processing apparatus according to the second embodiment has almost the same arrangement as that shown in FIG. 1 of the above-described first embodiment except that the dither processing unit 14 in the halftone processing unit 11 is replaced with an error diffusion processing unit. Hence, in the second embodiment, a description will be made below assuming that in place of the dither processing unit 14, an error diffusion processing unit 141 is provided in a halftone processing unit 11 of the arrangement shown in FIG. 1.

Moiré Detection Processing

Figure 10:
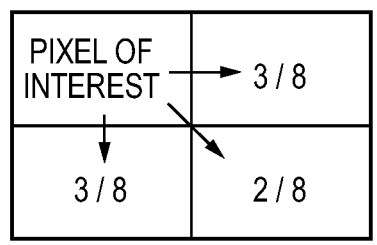
FIG. 10 is a view showing error diffusion processing coefficients and the diffusion direction according to the second embodiment.

FIG. 9 is a flowchart illustrating moiré detection processing according to the second embodiment. In step S141, the error diffusion processing unit 141 performs the so-called error diffusion processing by comparing the sum of the pixel value of the pixel of interest and a quantization error distributed from an adjacent pixel with a predetermined threshold sequentially from the upper left to the lower right of multilevel input image data. If the sum of the pixel value of the pixel of interest and the quantization error is equal to or larger than threshold "128", the corresponding pixel value in the halftone image data is set to "1". If the sum is smaller than threshold "128", the corresponding pixel value is set to "0". When the halftone pixel value is "0", the sum of the pixel value of the pixel of interest and the error distributed from the adjacent pixel is held in a memory (not shown) as the quantization error value. When the halftone pixel value is "1", a value obtained by subtracting 255 from the sum of the pixel value and the error is held as the quantization error value. The quantization error value is distributed to the adjacent pixels on the right, lower, and lower right sides of the pixel of interest after being multiplied by the coefficients corresponding to the pixel positions. FIG. 10 shows examples of pixel positions and quantization error value distribution coefficients (error diffusion filter) applied in the error diffusion processing of step S141.

An example of flat multilevel input image data including 16×16 pixels all of which have a pixel value "34" will be explained below. When the error diffusion processing of step S141 is performed for the multilevel input image data, halftone image data shown in FIG. 11 is obtained.

In step S142, a first filter unit 15 performs first filter processing for each pixel of the halftone image data generated by the error diffusion processing of step S141. That is, the filter processing target region is defined on a total of nine pixels including the pixel of interest and eight pixels adjacent to the pixel of interest in vertical, horizontal, and diagonal directions, and the sum of their pixel values is calculated. If the pixel of interest is located on the edge of the input image, and the adjacent pixels do not exist in the multilevel input image data, the pixel values of the adjacent pixels are regarded as 0.

When the first filter processing is performed for the halftone image data shown in FIG. 11, first filter-processed image data shown in FIG. 12A is obtained. Note that in the example described above the sum of the pixel values of a total of nine pixels including the pixel of interest and its adjacent pixels is calculated. However, the smoothing filter used in the first filter processing may have a different shape.

In step S143, a second filter unit 16 performs second filter processing for each pixel of the multilevel input image data through defining the filter processing target region including the same nine pixels as in the first filter processing of step S142. This processing is different from the first filter processing of step S142 only in that the processing target is not the halftone image data but the multilevel input image data. When the second filter processing of step S143 is applied to the above-described flat multilevel input image data including 16×16 pixels having a pixel value "34", second filter-processed image data shown in FIG. 12B is obtained.

Note that in the flowchart of FIG. 9, for example, the second filter processing of step S143 may be executed first because the error diffusion processing of step S141 and the first filter processing of step S142 have a dependence relationship but these processes and the second filter processing of step S143 have no dependence relationship. Alternatively, an implementation in which the processes of steps S141 and S142 and the process of step S143 are executed in parallel may be done.

In step S144, a difference evaluation unit 17 calculates the difference between the first filter-processed image data and the second filter-processed image data, and compares it with a predetermined threshold to obtain moiré determination data. At this time, the image data is normalized in the following way before difference calculation. More specifically, to make the first filter-processed image data obtained from the halftone image data with pixel values "0" and "1" match the second filter-processed image data obtained from the multilevel input image data with pixel values "0" to "255", each pixel value of the first filter-processed image data is multiplied by 255. After the first filter-processed image data shown in FIG. 12A has been normalized, the difference from the second filter-processed image data shown in FIG. 12B is calculated to obtain the difference image data shown in FIG. 13A. For each pixel of the difference image data shown in FIG. 13A, if the pixel value is equal to or larger than the threshold "256", the corresponding pixel value in the moiré determination data is set to "1". If the pixel value is smaller than "256", the corresponding pixel value is set to "0". Moiré determination data shown in FIG. 13B is thus obtained.

Note that in the second embodiment, an example has been described in which binary moiré determination data of 0 or 1 is created using a single threshold. However, providing a plurality of thresholds allows creating multilevel moiré determination data corresponding to the degree of moiré. Note that since one halftone dot corresponds to the quantization step width, the quantization step width "255" after normalization is configured as the threshold for moiré determination. The number of halftone dots located in a predetermined region (the reference region of the first filter unit 15) varies by about 1 dot depending on the value of multilevel input image data. For this reason, about 256 to 512 can be selected as the thresholds for moiré determination.

Note that in the second embodiment, when the moiré determination data is detected in the above-described way, a moiré reduction processing unit 13 performs moiré reduction processing, as in the above-described first embodiment. At this time, an error diffusion processing unit 18 in the moiré reduction processing unit 13 performs error diffusion processing by applying an error diffusion filter whose shape is different from that of the error diffusion processing unit 141. Note that since the error diffusion processing unit 18 performs halftone processing of characteristics different from those of the error diffusion processing unit 141, for example, FM screen (dispersed dither processing) may be executed.

As described above, according to the second embodiment, even when error diffusion processing is performed as halftone processing, appropriate moiré determination can be done as in the above-described first embodiment.

Third Embodiment

The third embodiment of the present invention will be described below. In the above-described first embodiment, if multilevel input image data includes an edge portion such as a thin line, the moiré detection accuracy degrades. In the third embodiment, an example will be described in which the moiré detection accuracy for an edge portion is improved to solve this problem.

Problem of Moiré Detection on Edge Portion

The decrease in the moiré detection accuracy on an edge portion will be explained first.

For example, assume that in the above-described embodiment, the dither processing unit 14 of the halftone processing unit 11 uses a threshold matrix having the screen angle of 45° shown in FIG. 17. In this case, the filter processing target region in the first and second filter units 15 and 16 of the moiré detection processing unit 12 has the same shape as that of the threshold matrix shown in FIG. 17 to remove the influence of the threshold cycle in the dither processing.

Figure 18A:
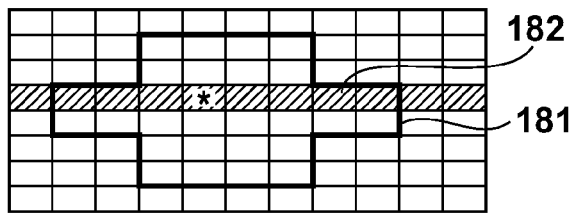
FIGS. 18A to 18F are views showing examples in which the evaluation value of moiré detection changes depending on the tilt of thin lines according to the third embodiment.
Figure 18B:
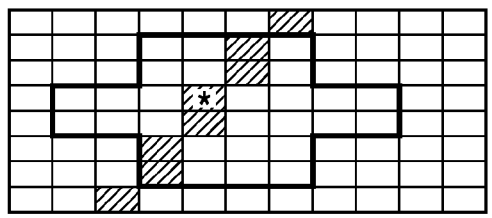
Figure 18C:
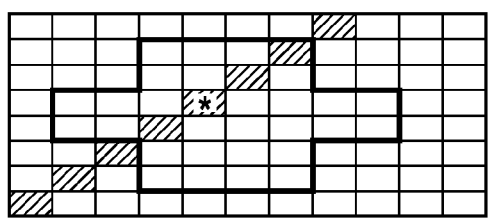
Figure 18D:
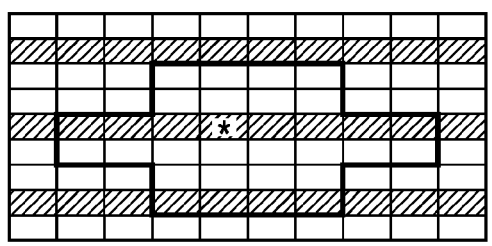
Figure 18E:
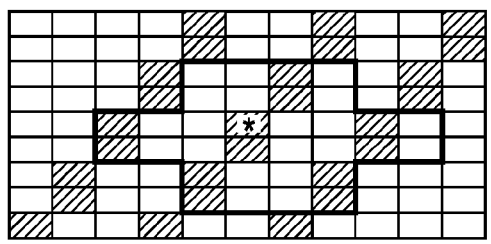
Figure 18F:
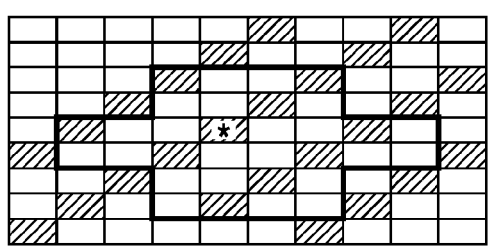

FIGS. 18A to 18F show the relationship between the tilt of a thin line included in multilevel input image data and the filter processing target region in the first and second filter units 15 and 16. Referring to FIG. 18A, * indicates the position of the pixel of interest. A region 181 surrounded by the thick line is the filter processing target region. A hatched region 182 indicates pixels that form a faint thin line. Note that all pixels in the region 182 have the same pixel value. FIGS. 18A to 18C illustrate examples in which the thin lines have different tilt angles in the same filter processing target region, and the numbers of pixels that form the thin lines included in the region are eight, six, and four, respectively. For this reason, in the above-described first embodiment, the moiré detection result may change when the thin lines have the same thickness and density but different tilt angles. FIGS. 18D to 18F illustrate examples in which thin lines at equal intervals have different tilt angles, and the numbers of pixels of the thin lines included in the filter processing target region are 12, 12, and 10, respectively, as in the above-described case. In this case as well, the moiré detection result may change. In addition, if the filter processing target region is wide, and no moiré exists near the pixel of interest, a density variation in a portion far apart from the pixel of interest may be detected and determined as moiré. Such a fluctuation in the evaluation value occurs in a portion with an edge such as a thin line.

Arrangement of Apparatus

Figure 19:
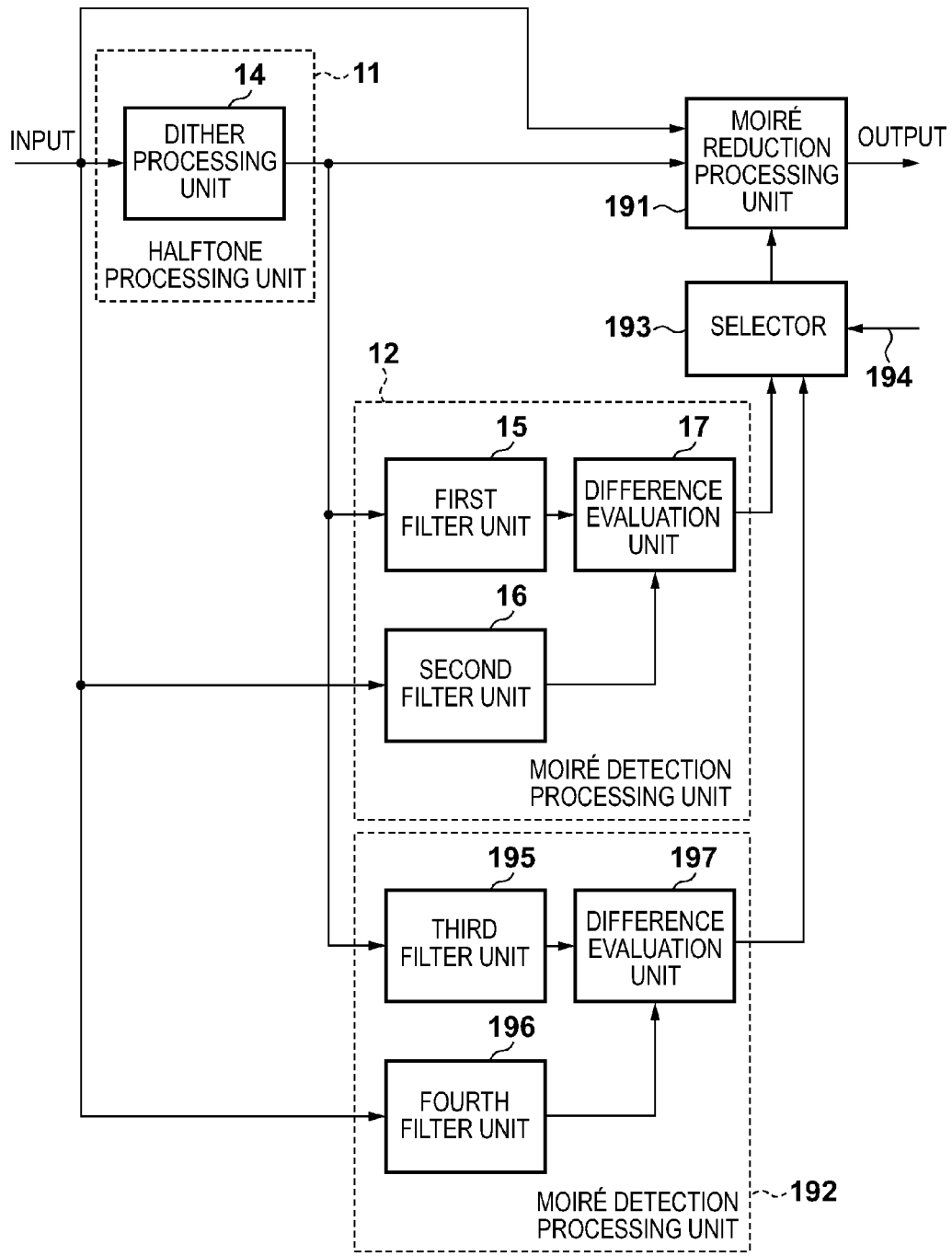
FIG. 19 is a block diagram showing an example of the arrangement of an image processing apparatus according to the third embodiment.

In the third embodiment, to accurately detect moiré even on the edge portion, the image processing apparatus has the arrangement shown in FIG. 19. The same reference numerals as in FIG. 1 of the above-described first embodiment denote the same parts in FIG. 19, and a description thereof will not be repeated. Referring to FIG. 19, the moiré reduction processing unit 13 of the arrangement in FIG. 1 is replaced with a moiré reduction processing unit 191, and a moiré detection processing unit 192, a selector 193, and an edge information input terminal 194 are added.

Outline of Processing

Moiré detection processing and moiré reduction processing according to the third embodiment will be described below. In the third embodiment as well, multilevel input image data is subjected to dither processing of a halftone processing unit 11 and then input to the moiré detection processing unit 12 and the moiré detection processing unit 192. Based on detected moiré determination data, the moiré reduction processing unit 191 performs moiré reduction processing.

First, the moiré detection processing unit 12 detects moiré by referring to a first region having the same size as that of the threshold matrix used in a dither processing unit 14 and outputs first moiré determination data representing a first moiré intensity, as in the above-described first embodiment.

The moiré detection processing unit 192 includes third and fourth filter units 195 and 196 and a second difference evaluation unit 197, and detects moiré by referring to, as a second filter processing target region, a region (area) narrower than the threshold matrix used by the dither processing unit 14. The second filter processing target region will be simply referred to as a second region hereinafter. The third filter unit 195 calculates the sum of pixel values for the pixel of interest in the halftone image data output from the halftone processing unit 11 and neighbor pixels (second region) defined with respect to the pixel of interest and including the pixel of interest. That is, the third filter unit 195 performs smoothing filter processing for the second region serving as the processing target in the halftone image data to generate third filter-processed data (third filter processing). At this time, a 3×3 pixel range is defined as the second region, as shown in FIGS. 20A to 20F, and the sum of pixel values in that region is calculated, as will be described later in detail. The fourth filter unit 196 calculates the sum of pixel values for the pixel of interest in the multilevel input image data and neighbor pixels similarly defined with respect to the pixel of interest like the second region. That is, the fourth filter unit 196 performs smoothing filter processing for the second region serving as the processing target in the multilevel input image data to generate fourth filter-processed data (fourth filter processing). The second difference evaluation unit 197 detects moiré based on the difference between the third filter-processed data that is the processing result of the third filter unit 195 and the fourth filter-processed data that is the processing result of the fourth filter unit 196, like a difference evaluation unit 17 (first difference evaluation unit). More specifically, to cancel the influence of tone reduction by the halftone processing unit 11, the filter processing results of the third and fourth filter units 195 and 196 are normalized based on the number of tones per pixel. After that, the difference between the halftone image data and the multilevel input image data is calculated as the second moiré intensity. If the absolute value of the difference exceeds a predetermined threshold, "1" is set and output as second moiré determination data.

The second moiré determination data detected by the moiré detection processing unit 192 is input to the selector 193. The first moiré determination data detected by the moiré detection processing unit 12 is also input to the selector 193. The selector 193 selects moiré determination data in accordance with the feature amount in the second region. For example, edge information extracted by performing filter processing such as 3×3 Laplacian filtering (not shown) for the multilevel input image data is input from the input terminal 194. The selector 193 selects one of the outputs from the moiré detection processing units 12 and 192 in accordance with the edge information. That is, based on the edge information, the selector 193 selects the output (second moiré determination data) from the moiré detection processing unit 192 for the pixels that form the edge portion and the output (first moiré determination data) from the moiré detection processing unit 12 for the remaining pixels. Note that as the feature amount, not the edge information but the dynamic range (the difference between the maximum value and the minimum value) in the second region may be used.

More specifically, when the density variation in the second region is large, the selector 193 can select the output from the moiré detection processing unit 192. For example, when selecting one of the outputs from the moiré detection processing units 12 and 192 based on the edge information, the selector 193 can select the output from the moiré detection processing unit 192 if the number of edge pixels in the second region is equal to or larger than a predetermined number (for example, one). On the other hand, if the number of edge pixels in the second region is smaller than the predetermined number, the selector 193 can select the output from the moiré detection processing unit 12. For example, if the absolute value of a pixel value after the edge enhancement filter processing is equal to or larger than a predetermined value, the pixel can be determined to be an edge pixel.

When selecting one of the outputs from the moiré detection processing units 12 and 192 based on the dynamic range, the selector 193 can select the output from the moiré detection processing unit 192 if the dynamic range in the second region is equal to or larger than a predetermined value. On the other hand, if the dynamic range in the second region is smaller than the predetermined value, the selector 193 can select the output from the moiré detection processing unit 12.

In this embodiment, the selector 193 selects one of the outputs from the moiré detection processing units 12 and 192 using the feature amount in the second region. However, the selector 193 may select one of the outputs from the moiré detection processing units 12 and 192 using the feature amount in a predetermined region centering on the pixel of interest. The predetermined region may be a region formed from one pixel, the first region, or a region in another size.

The moiré reduction processing unit 191 includes an error diffusion processing unit and an output selection unit, like the moiré reduction processing unit 13. The error diffusion processing unit performs halftone processing (for example, error diffusion processing or FM screen) of characteristics different from those in the dither processing unit 14. In accordance with the moiré determination data input from the selector 193, when moiré has been detected, the output selection unit selects and outputs the halftone processing result by the internal error diffusion processing or the like. On the other hand, if no moiré has been detected, the output selection unit selects and outputs the halftone processing result by the dither processing unit 14. This reduces moiré in the output image data. However, if the value of the multilevel input image data is "0", the error diffusion processing unit directly outputs the multilevel input image data.

Third and Fourth Filter Processing

The third and fourth filter processing according to the third embodiment will be described below. In the first and second filter processing, filter processing is performed for the first region having the same shape as that of the threshold matrix used by the dither processing unit 14. In the third and fourth filter processing, however, filter processing is performed for the second region in a smaller range different from the first region. For example, as described above, a 3×3 pixel region is applied as the second region. In this case, when the multilevel input image data and the halftone image data include a thin line having a width of, for example, one pixel, the thin line in the second region always includes pixels in the same number even if the tilt of the thin line changes. Hence, the sum of pixel values in the second region does not change depending on the tilt of the thin line, and accurate moiré detection can be performed. The filter that does not depend on the tilt of the thin line passing through the pixel of interest will be referred to as an "isotropic filter" hereinafter. As an isotropic filter, for example, a square filter (a filter whose reference pixel region includes equal number of pixels in vertical and horizontal directions) is usable.

Figure 20A:
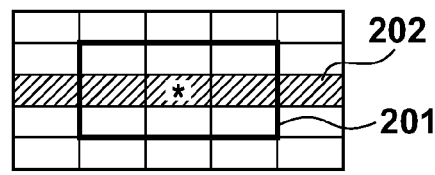
FIGS. 20A to 20F are views showing moiré detection by filters used in the third and fourth filter units.
Figure 20B:
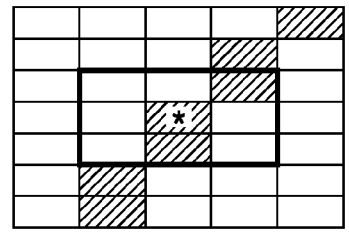
Figure 20C:
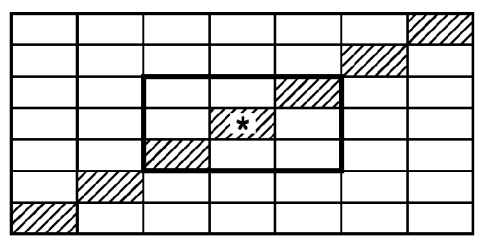
Figure 20D:
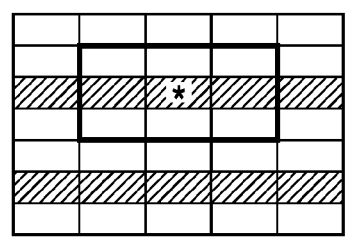
Figure 20E:
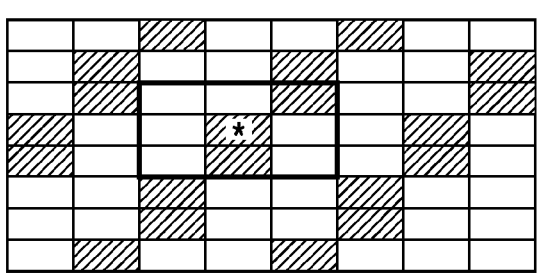
Figure 20F:
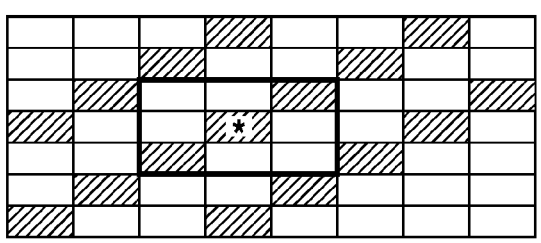

The second region to which the third and fourth filter processes are applied will be described here in detail with reference to FIGS. 20A to 20F. Referring to FIG. 20A, * indicates the position of the pixel of interest. A region 201 surrounded by the thick line is the second region. A hatched region 202 indicates pixels that form a faint thin line. Note that all pixels in the region 202 have the same pixel value. FIGS. 20A to 20C illustrate examples in which the thin lines have different tilt angles, like FIGS. 18A to 18C. The numbers of pixels that form the thin lines in the second region are equal and, more specifically, three. Hence, the same moiré detection result is obtained for the different tilt angles of the thin lines. FIGS. 20D to 20F illustrate examples in which thin lines at equal intervals have different tilt angles, like FIGS. 18D to 18F. In this case, all the thin lines in the second region have a predetermined number of pixels even if the tilt of the thin line changes. Hence, the same moiré detection result is obtained.

Figure 21A:
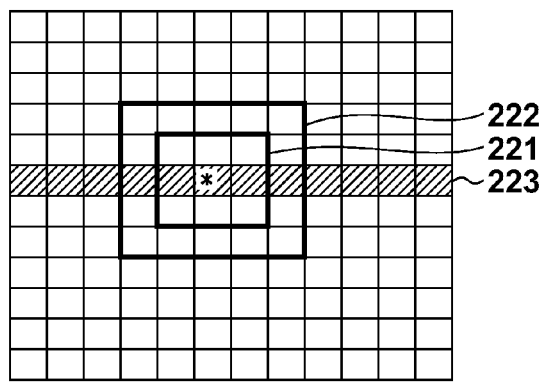
FIGS. 21A to 21F are views showing moiré detection by filters used in the third and fourth filter units according to the third embodiment.

The size of the isotropic filter (the size of the second region) will be explained here. FIGS. 21A to 21F show cases in which a 3×3 isotropic filter and a 5×5 isotropic filter are used as the second region of the third and fourth filter processing. Referring to FIG. 21A, a region 221 (thick line) including the pixel * of interest is the region to be processed using the 3×3 isotropic filter. A region 222 (thick line) including the pixel * of interest is the region to be processed using the 5×5 isotropic filter. A hatched pixel group 223 forms a faint thin line. Note that all pixels of the pixel group 223 have the same pixel value.

Figure 21D:
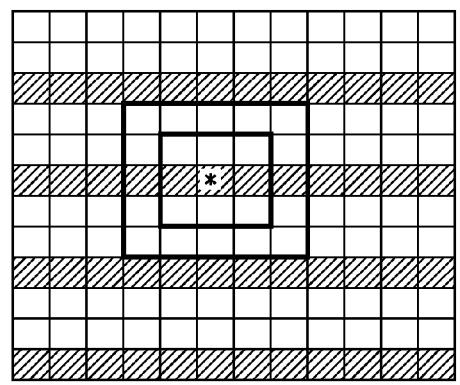
Figure 21B:
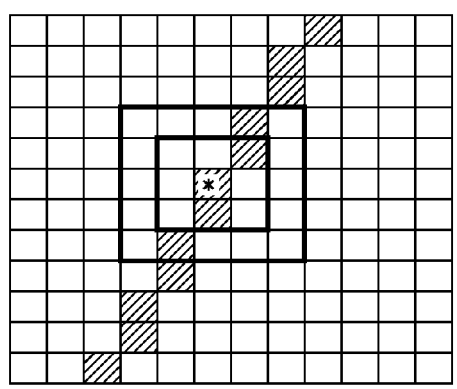
Figure 21E:
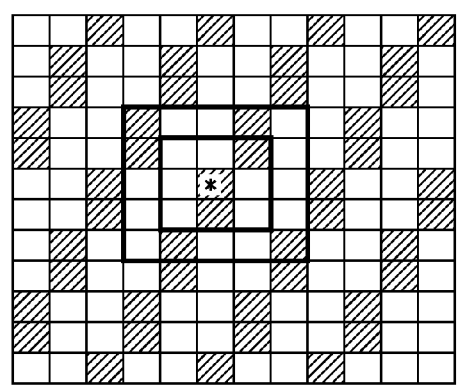
Figure 21C:
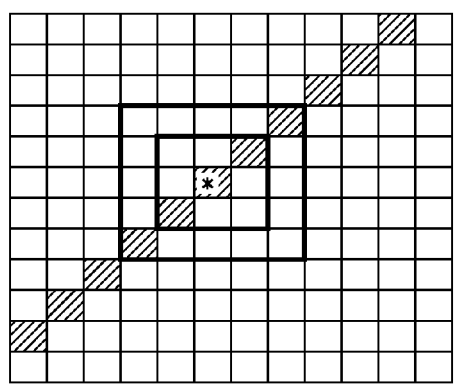

FIGS. 21A to 21C illustrate examples in which the thin lines have different tilt angles. However, all thin lines included in the region 221 are formed from three pixels. Additionally, all thin lines included in the region 222 are formed from five pixels. Hence, in all the cases shown in FIGS. 21A to 21C, the same moiré detection result is obtained by the isotropic filter if the filter size is the same.

Figure 21F:
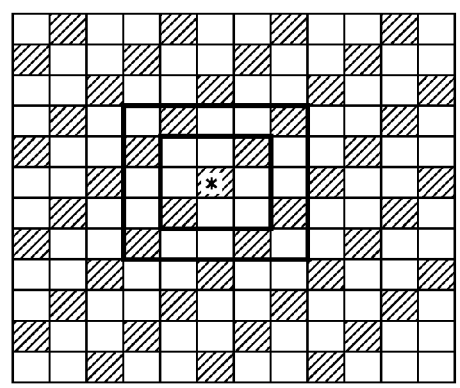

FIGS. 21D to 21F illustrate thin lines at equal intervals and different tilt angles. The region 221 is the smaller 3×3 region. For this reason, the numbers of pixels of the thin lines included in the region 221 are three in all of FIGS. 21D to 21F. Hence, the same moiré detection result is obtained. On the other hand, the region 222 is the larger 5×5 reference region. For this reason, the numbers of pixels of the thin lines included in the region are five, eight, and nine, as shown in FIGS. 21D to 21F. Hence, the moiré detection result may change.

As described above, when thin lines at equal intervals as shown in FIGS. 21D to 21F are included, and the filter size is large, the isotropy may be lost. Hence, the second region of the third and fourth filter processing can be as small as possible like the 3×3 region. On the other hand, the number of pixels of the thin line included in the 3×3 region is about three. Hence, the moiré detection sensitivity is three times when the filter size is 3×3. When the filter size is 5×5, the moiré detection sensitivity is five times. That is, if the multilevel input image data includes a faint thin line having a density of 33% or less in the full range, the total pixel value of three pixels is less than the value of one dot (quantization step width), and therefore, no moiré may be detected. On the other hand, in the 5×5 region, moiré can be detected for a thin line whose density is 25% or more in the full range. That is, if the primary object is moiré detection, the 5×5 filter has a higher detection accuracy. Note that even when the 5×5 filter is used, out of the 3×3 neighbor pixels, only pixels adjacent to the pixels of the thin line can be the filter target pixels. In this case, the number of filter target pixels is always 5 even when the image includes thin lines at equal intervals, as shown in FIGS. 21D to 21F. For this reason, the same moiré detection result (moiré intensity) can be obtained.

As described above, according to the third embodiment, accurate moiré detection can be done even in an image including a thin line or the like. It is therefore possible to perform halftone processing with excellent thin line reproducibility while suppressing moiré.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2010-229035, filed Oct. 8, 2010, and 2011-148623, filed Jul. 4, 2011 which are hereby incorporated by reference herein in their entirety.

What is claimed is:

1. An image processing apparatus comprising:
a first halftone processing unit configured to perform halftone processing on multilevel input image data to generate first halftone image data;
a first filter unit configured to perform smoothing filter processing on the first halftone image data to generate first filter-processed data, which processing is performed for each pixel of interest referring to a neighboring first region including the pixel of interest;
a second filter unit configured to perform smoothing filter processing on the multilevel input image data to generate second filter-processed data, which processing is performed for each pixel of interest referring to the first region;
a first difference evaluation unit configured to convert the first filter-processed data, from the first filter unit, and the second filter-processed data, from the second filter unit, to equalize the number of tones per pixel, and calculate a difference between the converted first and second filter-processed data, respectively from the first and second filter units, for each pixel as a first moiré intensity;

a third filter unit configured to perform smoothing filter processing on the first halftone image data to generate third filter-processed data, which processing is performed for each pixel of interest referring to a neighboring second region including the pixel of interest, and wherein the second region is smaller than the first region;

a fourth filter unit configured to perform smoothing filter processing on the multilevel input image data to generate fourth filter-processed data, which processing is performed for each pixel of interest referring to the second region;

a second difference evaluation unit configured to convert the third filter-processed data, from the third filter unit, and the fourth filter-processed data, from the fourth filter unit, to equalize the number of tones per pixel, and calculate a difference between the converted third and fourth filter-processed data, respectively from the third and fourth filter units, for each pixel as a second moiré intensity; and a moiré intensity selection unit configured to select one of the first moiré intensity and the second moiré intensity based on a feature amount in the multilevel input image data in a predetermined region including the pixel of interest, and output the selected moiré intensity.

2. The apparatus according to claim 1, further comprising:
a second halftone processing unit configured to perform halftone processing on the multilevel input image data to generate second halftone image data, wherein characteristics of the halftone processing by said second halftone processing unit is different from those of the halftone processing by said first halftone processing unit; and
a selection unit configured to select the first halftone image data when the moiré intensity is not more than a predetermined threshold, and select the second halftone image data when the moiré intensity is more than the predetermined threshold.

3. The apparatus according to claim 1, wherein
said first halftone processing unit is further configured to perform halftone processing based on a predetermined halftone processing cycle, and
the first region has a shape corresponding to the halftone processing cycle.

4. The apparatus according to claim 3, wherein said first halftone processing unit is further configured to perform dither processing on the multilevel input image data using a threshold matrix having the halftone processing cycle as a threshold cycle.

5. The apparatus according to claim 4, wherein the first region corresponds to a region where thresholds included in the threshold matrix appear the same number of times on a plane filled with the threshold matrix.

6. The apparatus according to claim 4, wherein said first filter unit and said second filter unit are further configured to perform, on a plane filled with the threshold matrix, smoothing filter processing while setting, for each pixel of the first region, a weight coefficient corresponding to an appearance frequency of each threshold or a total weight corresponding to each threshold inside the first region.

7. The apparatus according to claim 4, wherein said third filter unit and said fourth filter unit are further configured to perform filter processing using a filter whose reference pixel region includes pixels in equal number in vertical and horizontal directions.

8. The apparatus according to claim 1, wherein the feature amount is an edge amount.

9. The apparatus according to claim 1, wherein the feature amount is a dynamic range.

10. An image processing method comprising the steps of:
performing halftone processing on multilevel input image data to generate first halftone image data;
performing smoothing filter processing on the first halftone image data to generate first filter-processed data, which processing is performed for each pixel of interest referring to a neighboring first region including the pixel of interest;
performing smoothing filter processing on the multilevel input image data to generate second filter-processed data, which processing is performed for each pixel of interest referring to the first region;
converting the first filter-processed data and the second filter-processed data to equalize the number of tones per pixel;
calculating a difference between the converted first and second filter-processed data for each pixel as a first moiré intensity;
performing smoothing filter processing on the first halftone image data to generate third filter-processed data, which processing is performed for each pixel of interest referring to a neighboring second region including the pixel of interest; and
wherein the second region is smaller than the first region;
performing smoothing filter processing on the multilevel input image data to generate fourth filter-processed data, which processing is performed for each pixel of interest referring to the second region;
converting the third filter-processed data and the fourth filter-processed data to equalize the number of tones per pixel;
calculating a difference between the converted third and fourth filter-processed data for each pixel as a second moiré intensity;
selecting one of the first moiré intensity and the second moiré intensity based on a feature amount in the multilevel input image data in a predetermined region including the pixel of interest; and
outputting the selected moiré intensity;
wherein at least one of said steps is performed by a computer.

11. A non-transitory computer-readable storage medium storing an executable program for causing a computer to function as the image processing apparatus of claim 1.

12. The apparatus according to claim 1, wherein said first filter unit and said second filter unit perform the smoothing filter processing using the same filter.

13. The apparatus according to claim 1, wherein said third filter unit and said fourth filter unit perform the smoothing filter processing using the same filter.

14. The apparatus according to claim 1, wherein the second region includes equal number of pixels in vertical and horizontal directions.

15. The apparatus according to claim 13, wherein said third filter unit and said fourth filter unit are further configured to perform the smoothing filter processing using an isotopic filter.

16. An image processing apparatus comprising:
an acquisition unit configured to acquire multilevel input image data;

a halftone processing unit configured to perform halftone processing on the multilevel input image data to generate halftone image data; and a moiré intensity output unit configured to:

output a first region value based on a difference between the halftone image data and the multilevel input image data, at a first region including neighboring pixels around a pixel of interest, as a moiré intensity for the pixel of interest in case that the number of edge pixels in a predetermined region around a pixel of interest in the multilevel input image data is less than a predetermined number; and output a second region value based on a difference between the halftone image data and the multilevel input image data, at a second region including neighboring pixels around a pixel of interest, as a moiré intensity for the pixel of interest in case that the number of edge pixels in the predetermined region around the pixel of interest in the multilevel input image data is equal to or more than the predetermined number;

wherein the second region is smaller than the first region.

17. The apparatus according to claim 16, wherein the difference between the halftone image data and the multilevel input image data is obtained from the halftone image data and the multilevel input image data which are normalized so that the numbers of tones per pixel are equalized.

18. An image processing method comprising the steps of:

acquiring multilevel input image data;

performing halftone processing on the multilevel input image data to generate halftone image data;

outputting a first region value based on a difference between the halftone image data and the multilevel input image data, at a first region including neighboring pixels around a pixel of interest, as a moiré intensity for the pixel of interest in case that the number of edge pixels in a predetermined region around a pixel of interest in the multilevel input image data is less than a predetermined number; and outputting a second region value based on a difference between the halftone image data and the multilevel input image data, at a second region including neighboring pixels around a pixel of interest, as a moiré intensity for the pixel of interest in case that the number of edge pixels in the predetermined region around the pixel of interest in the multilevel input image data is equal to or more than the predetermined number;

wherein the second region is smaller than the first region;

wherein at least one of said steps is performed by a computer.

* * * * *